(12) United States Patent
Boyle

(10) Patent No.: US 6,397,596 B1
(45) Date of Patent: Jun. 4, 2002

(54) SELF CONTAINED GENERATION SYSTEM USING WASTE HEAT AS AN ENERGY SOURCE

(76) Inventor: Heather Boyle, 200 W. 34th St. #856, Anchorage, AK (US) 99503

( * ) Notice: Subject to any disclaimer, the term of this patent is extended or adjusted under 35 U.S.C. 154(b) by 0 days.

(21) Appl. No.: 09/846,915

(22) Filed: Apr. 30, 2001

(51) Int. Cl.[7] ............................. F02G 1/00; F02G 3/00
(52) U.S. Cl. ............................ 60/597; 60/614; 60/616; 60/698
(58) Field of Search .................... 60/597, 598, 599, 60/605.1, 670, 614, 616, 618, 698

(56) References Cited

U.S. PATENT DOCUMENTS

| | | | | |
|---|---|---|---|---|
| 4,380,909 A | * | 4/1983 | Sung | 62/79 |
| 4,864,151 A | * | 9/1989 | Wyczalek et al. | 60/597 X |
| 5,311,927 A | * | 5/1994 | Taylor et al. | 165/64 |
| 5,327,987 A | * | 7/1994 | Abdelmalek | 60/618 X |
| 5,875,633 A | * | 3/1999 | Lawson, Jr. | 60/618 |

* cited by examiner

Primary Examiner—Hoang Nguyen
(74) Attorney, Agent, or Firm—Michael J. Tavella

(57) ABSTRACT

An electrical generation system that fully integrates heat utilization during the process. The system has two inputs: intake air and diesel fuel. Its outputs are some exhaust gas (carbon dioxide and nitrogen compounds), electricity, and extracted sulfur compounds. There are four interconnected systems: the turbine-diesel-generator system, the refrigerant gas system, the ammonia system and the water handling system. The refrigerant system uses R 22 (Freon) gas. Using heat extracted from the diesel engine and other components of the system, this gas is heated and is used to drive a turbine. The ammonia system is primarily used to condense the R 22. The water system is primarily used to cool the exhaust gasses from the diesel engine. As discussed below, the systems overlap so that, for example, one system is cooled while pre-heating another.

18 Claims, 12 Drawing Sheets

*Last Stage

States
{
State-0: H₂O;
Given: { p0= 15.0 psia;  T0= 120.0 deg-F; }       { h0= 88.0 BTU/lb;  h3= 460.7 BTU/lb;

State-1: H₂O;
Given: { p1= 50.0 psia;  s1= 0.1646 Btu/lbm°R; }  { p0= 15.0 psia;   p3= 550.0 psia;

State-2: H₂O;
Given: { p2= 50.0 psia;  x2= 20.0 %; }            { T0= 120.0 °F;    T3= 476.8 °F.

State-3: H₂O;
Given: { p3= 550.0 psia; s3= 0.6608 Btu/lbm°R; }
}

States

State-0: H₂O > Compressed Liquid:
Given:      p0= 15.0 psia;           T0= 120.0 deg-F;
Calculated: p0=   15.0   psia;       T0= 120.0  deg-F;    h0=  88.0 Btu/lbm;
            s0=   0.1646 Btu/lbm°R;  v0= 0.016  ft^3/lbm; u0=  88.0 Btu/lbm;
            rho0= 61.7   lbm/ft^3;   x0= 0.0    %;

State-1: H₂O > Compressed Liquid:
Given:      p1= 50.0 psia;
Calculated: p1=   50.0   psia;       T1= 120.0  deg-F;    h1=  88.1 Btu/lbm;
            s1=   0.1646 Btu/lbm°R;  v1= 0.016  ft^3/lbm; u1=  87.9 Btu/lbm;
            rho1= 61.7   lbm/ft^3;   x1= 0.0    %;

State-2: H₂O > Saturated Mixture;
Given:      p2= 50.0 psia;           x2= 20.0 %;
Calculated: p2=   50.0   psia;       T2= 281.0  deg-F;    h2= 435.0 Btu/lbm;
            s2=   0.6608 Btu/lbm°R;  v2= 1.71   ft^3/lbm; u2= 419.1 Btu/lbm;
            rho2= 0.58   lbm/ft^3;   x2= 20.0   %;

State-3: H₂O > Compressed Liquid;
Given:      p3= 550.0 psia;          s3= 0.6608 Btu/lbm°R;
Calculated: p3=   550.0  psia;       T3= 476.8  deg-F;    h3= 460.7 Btu/lbm;
            s3=   0.6608 Btu/lbm°R;  v3= 0.019  ft^3/lbm; u3= 458.7 Btu/lbm;
            rho3= 50.15  lbm/ft^3;   x3= 0.0    %.

Figure 13

SELF CONTAINED GENERATION SYSTEM USING WASTE HEAT AS AN ENERGY SOURCE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the invention

This invention pertains to waste heat power generation systems and particularly to waste heat-generating systems that utilize refrigerant gasses as the waste heat recovery medium

2. Description of related art

Electrical generation facilities fall into three main types: large-scale plants that use coal, oil or nuclear power to generate steam to drive a turbine-generator set; moderate scale plants that use natural gas to fire turbine-generator sets; and small scale plants that use various fuels and methods to generate electricity. All of these plants operate on thermodynamic cycles that are less than forty-percent efficient, which results in the production of large quantities of so-called waste heat. Currently, much of this heat is exhausted into the atmosphere or waterways through exhaust stacks and cooling towers. As energy costs began to rise over the last twenty years, engineers have studied the uses for waste heat as a way to return more of the economic value from the energy input into the system. A simple example of such a system is a gas turbine. The exhaust gas of the turbine can be passed through a heat exchanger to make steam that can drive a steam turbine to produce additional electrical output. Another example is a diesel generator that has a heat exchanger on its exhaust that can be used to heat buildings.

Despite these improvements in the use of waste heat, these systems do not fully utilize all of this energy, because they are only designed to recover so-called "high quality" waste heat, typically at temperatures significantly above that at which steam condenses and loses it's latent heat of vaporization. As such, those systems do not have the most efficient overall heat use.

BRIEF SUMMARY OF THE INVENTION

The challenges of recovery and utilization of this "waste" heat, with a large reduction in the quantity and nature of particulate matter and noxious gasses vented to the atmosphere are the subject of this invention.

In one particular case, the engine exhaust gas flow is condensed and scrubbed, with utilization of exhaust, radiant, and jacket water waste heat, which, when converted from heat energy to mechanical energy, makes possible a significant reduction in fuel usage per unit energy.

Thus, the instant invention is here presented as an electrical generation system, in this particular implementation, that fully integrates heat utilization during the process of electric power generation with a maximum conversion from heat energy to mechanical energy with minimal energy losses and environmental pollution. As such, the energy efficiency of the entire system is much improved.

While the principles are directly applied in this one instance, the system is scalable in nature and is easily retrofit to any existing facility where there is a heat energy source with an energy density of sufficient magnitude.

The system is contained within a thermodynamic boundary. Energy is input to the system in the form of diesel fuel and heat contained in the combustion air. Electric power, exhaust gas flow cooled to near ambient atmospheric temperature, sound and vibration, and water exit the boundary. An energy sink is provided by a turbine (through connection to the generator and its subsequent connection to a sufficient electrical load), where heat energy is converted to rotative mechanical energy used to power the generator.

There are four interconnected systems:

1) A diesel engine that provides motive power for the generator and is the primary source of waste heat for the recovery system's use;
2) a primary, high temperature refrigeration system used to supply energy to the recovery turbine;
3) a secondary refrigeration system to provide proper operating parameters for the recovery turbine exhaust, and
4) a water handling system.

The high temperature refrigerant selected is R 22, a common hydroclorofluorocarbon, and is selected for the following characteristics:

1) a critical temperature at or slightly below the boiling point of water at atmospheric pressure;
2) a superheated gas inlet temperature and pressure within conventional turbine operating and manufacturing capabilities;
3) vapor characteristics that allow for condensation at or above atmospheric pressure, but below 75 psia, at −20° F.;
4) a low latent heat of vaporization to minimize system support complexity;
5) a high molecular mass;
6) environmentally friendly;
7) a substance that is readily available;
8) a system architecture within the capabilities of those who are semiskilled in refrigeration systems operation and repair techniques; and
9) a large superheat value when heated to between 250° and 350° F.

The refrigerant R 22 embodies all of these criteria, with the exception of 4.

A heat engine, embodied as an axial turbine, converts heat energy contained in the R 22 vapors to mechanical energy output from the turbine shaft.

To accommodate the condensing requirements of R 22, and to permit conservation of the energy contained as the latent heat of condensation of the turbine vapor discharge, a separate refrigeration system is needed to create a condensing environment for the vapors exhausted from the turbine. An ammonia subsystem is used for this purpose, and for the following reasons:

1) a −20° F. evaporator temperature obtainable at or above atmospheric pressure;
2) a high latent heat of vaporization to minimize system requirements;
3) a condensing temperature within the range of commercially available evaporative condensers when radiating the latent heat of condensation to ambient air;
4) environmentally friendly;

5) a substance that is readily available; and
6) a system architecture within the capabilities of those who are semiskilled in refrigeration systems operation and repair techniques.

The ammonia system is used to anchor the recovery turbine outlet (R22 condensing) temperature at −15° F.

The water system is used to cool and condense the diesel engine exhaust gas flow, to supply the evaporative condensing system with evaporant, and to act as a reservoir for the water that results from the oxidation of hydrogen and hydrocarbon fuels. Extraction and further conversion of combustion by-products such as carbon dioxide, nitrous oxides, sulfur oxides, unburned hydrocarbons, carbon, other particulate matter, as well as important emergency system shut down functions, are also enabled by this reservoir.

As is further described below, the separate systems identified are thermodynamically interconnected, so that one system gives up heat to another system at particular places where such interconnecting improves or enables system operation and/or system performance goals.

System Operational Overview

A diesel engine is used to rotate an electric generator to produce power. The engine jacket water is cooled by a heat exchanger. The operating fluid used to cool the engine jacket water is R 22. Here, R 22 is converted from a high pressure, high temperature liquid to a high pressure, superheated vapor as it absorbs the heat rejected to the water cooling the engine.

The diesel engine exhaust is routed to an exhaust gas condenser where water is used to cool and condense the superheated gasses and other constituents that make up the exhaust flow. The water used to cool and condense this flow is maintained at an appropriate operating temperature by using a heat exchanger. The operating fluid used to cool this water is R 22. The R 22 is converted from a high pressure, high temperature liquid to a high pressure, superheated vapor as it absorbs the heat rejected to the water cooling the exhaust gas flow within the exhaust gas condenser.

The combined R 22 superheated flow from these two heat exchangers is routed to the recovery turbine primary inlet connection.

In this particular implementation, the recovery turbine used is an impulse turbine of axial construction, with two energy inlet connections:

The first is for the superheated vapor flow coming from the heat exchangers.

The second is used to both reheat and increase the R 22 vapor flow rate in a secondary stage of the turbine, which is discussed below.

The recovery turbine, in this particular implementation, is free running and directly connected to the second input shaft of the main electric generator. With the diesel engine fuel control maintaining a constant system synchronous speed, the engine specific fuel consumption for a given energy output will decrease by an amount equal to the rotating energy thermodynamically converted from heat energy to mechanical energy and output by the turbine.

To condense the exhausted R 22 vapor exiting the turbine's last stage, it is necessary to remove an amount of heat equal to its latent heat of condensation at a specific temperature and pressure relationship.

This condition is created by using an ammonia refrigeration system. The condensing temperature for the R 22 vapor is set, in this particular implementation, at −15° F. The latent heat of condensation of the R 22 is absorbed by ammonia evaporation and expansion. The evaporated ammonia, and the energy it contains, is input to the ammonia compressor suction, where the ammonia vapor's pressure and temperature relationship is changed. The energy used by the compressor to accomplish this change is contained within the compressor discharge flow.

The ammonia compressor discharge flow is routed through an evaporative condenser where most of the latent heat of condensation is removed by the evaporation of water within the evaporative condenser. The diesel engine combustion air intake creates an airflow that enhances the evaporation of water by and within the evaporative condenser. The energy entrained within this flow becomes part of the heat energy input to the diesel engine. The mass of the intake airflow is also increased by an amount equal to the weight of the water evaporated. This alters engine operating and combustion characteristics, described below.

The exiting ammonia flow is now routed to a heat exchanger in the R 22 liquid line. Here, more heat energy is removed from the ammonia compressor discharge and is imparted to the liquid R 22. This raises the specific heat value of the R 22 liquid flow, while removing more of the latent heat of condensation from the ammonia compressor discharge. This preheating of the R 22 liquid decreases the net refrigeration efficiency, per unit mass, of the R 22 at the heat exchangers for the engine and exhaust gas condenser. This increases the net flow rate of R 22 through the recovery turbine.

Heat rejected from the generator and other system components within the thermodynamic boundary is also contained within this airflow. The elevated temperature of the ambient air, caused by radiated heat from system auxiliaries' operation, increases the evaporation rate of water by increasing the intake air temperature.

It is an object of this invention to produce a generation system that uses a minimal energy input to produce the maximum energy output.

It is another object of this invention to produce a generation system that uses waste heat produced as a useful element in the generation cycle.

It is a further object of this invention to produce a generation system that uses an integrated set of subsystems that maximize the efficiency of the generation system.

It is yet a further object of this invention to produce a generation system that enables recovery and reduction of environmental pollutants being emitted into the atmosphere as a result of the generation of electricity.

BRIEF DESCRIPTION OF THE DRAWINGS

FIG. 13 is the result of a mathematical model showing conditions and a manner of preheating boiler feed water in the third embodiment.

DETAILED DESCRIPTION OF THE INVENTION

In the preferred embodiment, there are four interconnected systems:

1) a turbine-diesel-generator system;
2) an R 22 refrigerant gas system;
3) an ammonia refrigerant gas system, and
4) a water handling system.

It is important to keep in mind that each of the subsystems listed below are thermodynamically interconnected at various points. The intent is two fold:

First, R 22 has a relatively high latent heat of condensation when compared to the degree that it can be superheated without resorting to exotic pressures and temperatures. In an effort to maximize the R 22 flow through the recovery turbine, the R 22 system must be run as inefficiently as possible (in a refrigeration sense) regarding the quantity of R 22 needed to remove sufficient heat from the engine and exhaust gas condenser coolants. This requires that the liquid R 22 must be raised to as high an energy level as possible from sources other than the engine and exhaust gas condenser heat exchangers, so that when the R 22 does expand in these two heat exchangers, a maximum 'pounds per hour' flow relative to heat input from these two R 22 heat exchangers is achieved.

Second, ammonia has a very high latent heat of condensation and vaporization; the energy required to produce one ton of refrigeration capacity is very low. This means that the parasitic load requirements caused by operation of the ammonia condensing system's operation are minimized.

Figure 1:
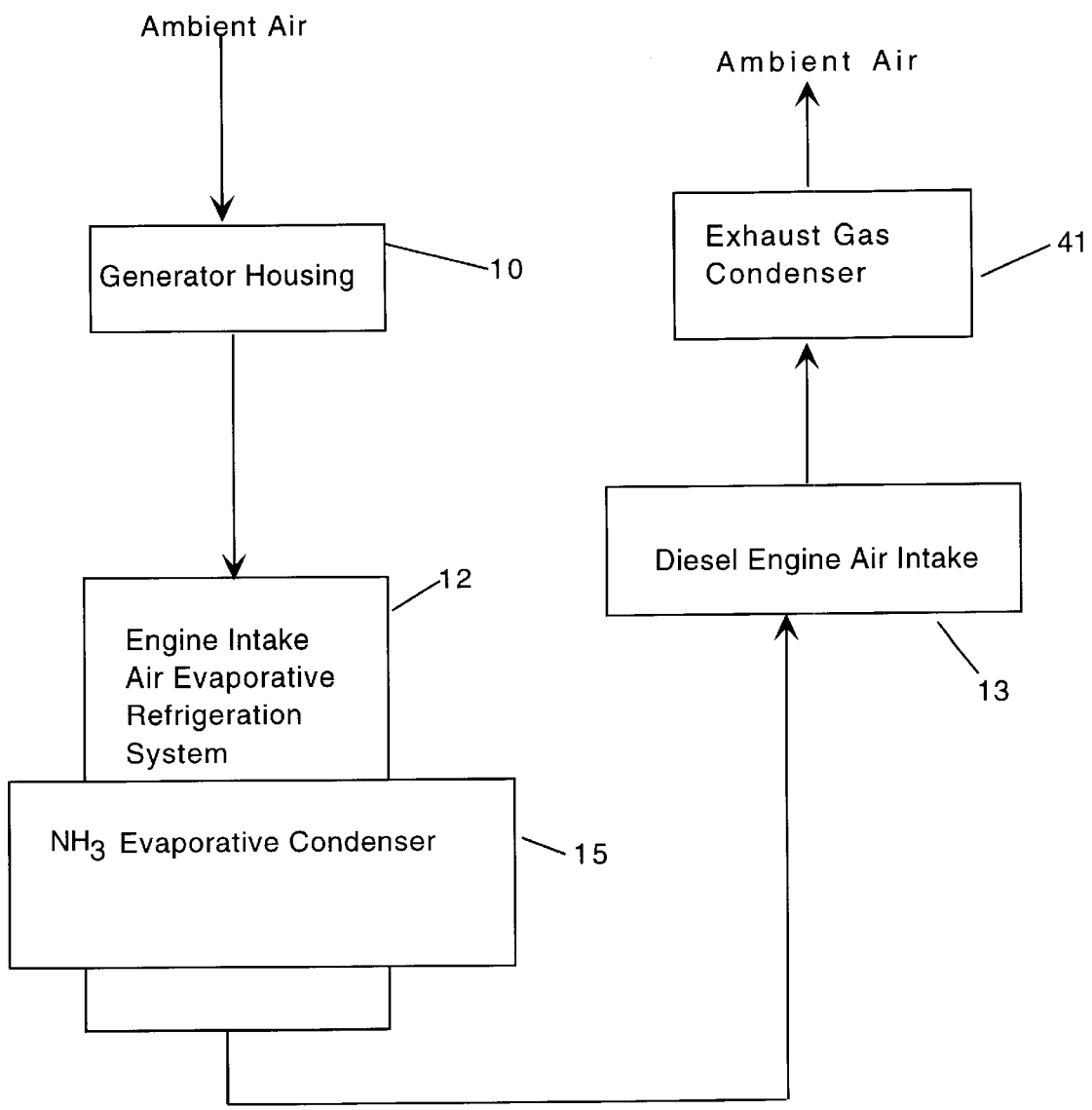
FIG. 1 is a schematic view of the air intake subsystem.

Referring now to FIG. 1, the air intake subsystem is shown. In the preferred embodiment, the system intake airflow is cold and dry. This is to accommodate and enhance the cooling capacity of the evaporative condenser, as discussed below. Higher ambient intake air temperature operation is also possible, but if the incoming air is also high in humidity, system modifications may be required.

Cooling of the main generator 10 is accomplished by routing the engine's intake air through the generator housing.

The volume of combustion air is sufficient to provide ample cooling of the generator proper, if a generator rated for a low temperature rise (45° or 60° C. at rated load) is used. Heat rejected by generator resistive, windage, and hysteresis losses are therefore minimized. A further improvement in generator mechanical efficiency is accomplished by removal of the parasitic load imposed by the cooling fan, which is no longer required to provide cooling airflow through the generator.

Upon leaving the generator housing, the intake air stream is allowed to permeate within the thermodynamic boundary defined by the room enclosing the system. Here, ambient air absorbs radiated heat energy from all system components. It is important that all sources of radiant heat energy be sufficiently insulated to keep the quantity of heat rejected to the intake airflow from these sources to a minimum.

The evaporative condenser air intake 12 is located near the ceiling of the room. Air is drawn through this device by the diesel engine's operation. This device is used to remove latent heat of condensation from the ammonia subsystem as discussed below. Here, the air passes across radiators within the ammonia evaporative condenser 15, where heat rejection efficiency is increased by evaporating water supplied from the chilled water reservoir, also discussed below. The heat energy removed from the condensing ammonia is added to the engine intake airflow, where it becomes a part of the energy input to the diesel engine.

The saturated intake air is drawn into the prime mover's intake fitting 13. Current technology diesel engines use an exhaust gas flow driven turbocharger to increase intake air mass available within each cylinder to improve combustion efficiency and engine load carrying capacity. Here, at the engine intake air fitting 13, the airflow is saturated to a relative humidity nearing 100%. To explain the effects of this condition on engine operation, it is necessary to detail those dynamics of diesel engine operation regarding combustion and energy conversion efficiency, as well as effects on the byproducts created during fuel combustion.

The intake air is compressed by the turbocharger, with an increase in temperature and pressure of the intake air within the engine's intake passages. The temperature of the intake air discharged by the turbocharger can rise several hundred degrees Fahrenheit, depending on the physical constituents and specific heat of the intake airflow, and other physical operating conditions The intake airflow from the turbocharger is directed through an intercooler. This intercooler moderates the intake airflow temperature by either rejecting excessive airflow heat to the engine cooling system or increasing the temperature in very low power operating conditions.

Here, raising the specific mass of the intake air flow by inclusion of water vapor added to the intake air flow by the evaporative condenser has a significant effect on the compression, combustion, expansion cycles, and other physical characteristics during normal engine operation. These effects are discussed below.

Compression

Intake air pressure and mass per unit volume relate directly to the amount of oxygen available in the intake air charge to each cylinder for use in burning the fuel charge. If the engine is operated at a constant speed, increasing the engine load will cause an increase in the fuel rate to maintain that constant speed, with a concomitant increase in exhaust gas temperature and flow rate. This increase in energy flow causes the engine turbocharger to extract an increased amount of energy from the exhaust flow. This causes the engine turbocharger speed to increase; which causes an increase in intake air pressure within the engine intake manifold; which in turn causes more oxygen to be available and allows further increases in fuel rate with minimal unburned fuel in the exhaust flow.

The specific heat and mass per unit volume of the intake air charge made available to each cylinder is different when comparing normal dry intake air and water saturated intake air. Saturated air has a higher specific heat content per unit volume than dry air, at the same temperature and pressure.

By entraining the superheated water vapor, evaporated by condensing the ammonia vapors, the energy absorbed by the water's evaporation is now contained within the intake airflow stream. This moisture content raises the mass of the intake airflow stream, and adds to the heat energy input to the engine. The oxygen content per unit mass may decrease slightly, but any decrease is accounted for, and mostly corrected by, the operating characteristics of the engine turbocharger.

When considering both the increased mass and specific heat, it can be shown that the peak pressure before fuel injection is higher, while the peak temperature is lower.

Combustion

In a diesel engine, it is the heat resulting from the compression of the intake air charge that causes auto-ignition of the fuel charge supplied to the individual cylinders.

At the moment of injection, the fuel will first mix with the air charge, and then auto-ignite at combustion temperature. With the intake airflow to the engine saturated as described above, maximum cylinder pressure will increase due to the increased mass within the cylinder. This is caused by the presence of entrained water vapor from the evaporative condenser being added to the superheated steam created by the oxidation of the hydrogen contained in the fuel. Because the mass of the cylinder's content is therefore increased, for a like amount of fuel injected, a lower peak cylinder firing temperature results.

Expansion

After ignition of the fuel within the cylinders of the engine as described above, the resulting gas pressure acts upon a movable piston. The piston's motion is transferred through engine components resulting in mechanical work output. In essence, the rate of pressure drop caused by the cylinder's volumetric increase is retarded. This means that pressure within the cylinder remains higher throughout the expansion cycle, resulting in a larger amount of energy transferred to engine components per expansion cycle and the resulting increase in mechanical work output.

The nature of a diesel engine is such that controlling the fuel input to the engine is what controls both the engine speed and work output. Using the above processes, for a constant engine speed and load, it requires less fuel energy input to derive the same mechanical work output, when comparing dry intake air to moist intake air, resulting in a decrease in brake specific fuel consumption.

Other Operating Factors

Exhaust gas flow mass increases with a corresponding decrease in absolute gas temperature. Because of the decrease in peak firing temperature, a significant decrease in the quantity of nitrous oxides present in the exhaust flow results.

Sulfur compounds, resulting from oxidation of the sulfur contained in the fuel source, are condensed or precipitated and become suspended in the fluid condensing the engine exhaust. Using conventional pH regulating techniques, these compounds can be neutralized and are not released into the atmosphere.

Finally, the superheated steam entrained within the exhaust flow is condensed in the exhaust gas condenser. This latent heat of condensation is then used to vaporize R 22, the operating fluid for the recovery turbine, as discussed below.

Figure 2:
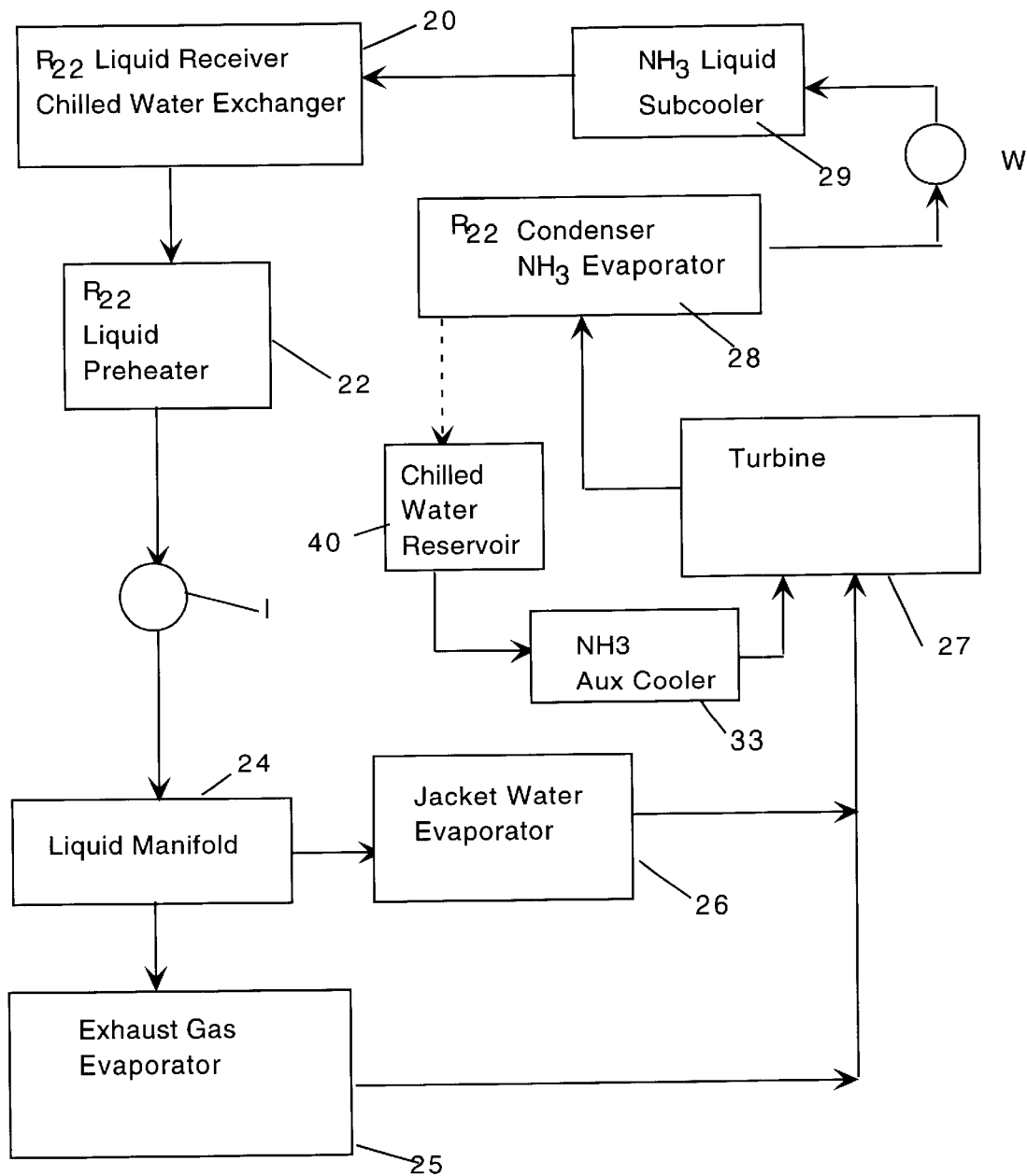
FIG. 2 is a schematic view of the R 22 subsystem.

Refer now to FIG. 2, where details of the R 22 subsystem are shown. The cycle starts at the R 22 liquid receiver 20. Here, R 22 liquid is stored. The pressure is defined by the output pressure of W, the R 22 liquid pump. Design pressure at this location for the liquid R 22 is 300 (+150/−0) psia.

When the system is operating, liquid R 22 leaves the receiver and flows to the R 22 liquid preheater 22, where its temperature is raised by the energy contained in the ammonia compressor discharge, through a heat exchanger. This heat exchanger functions as a secondary ammonia condenser. The maximum R 22 temperature allowed exiting this heat exchanger is 120° F. This is required by the physical properties of R 22 at this pressure to ensure that the R 22 liquid does not become a saturated vapor at this point.

The intent of this secondary ammonia condensing stage is to remove more heat from the condensing ammonia vapors and further to decrease the thermal efficiency of the R 22 system. The ultimate effect of this results in an increased R 22 flow rate through the recovery turbine.

The booster pump I moves the R 22 to liquid manifold 24. The high-pressure liquid R 22 is collected here for distribution. The manifold acts as both a reservoir and an accumulator to dampen high-pressure spikes (waves) caused by the R 22 liquid pump and operation of the liquid level expansion control system. Thus, pump I is used to ensure sufficient flow of R 22 to the liquid level control system. From the liquid manifold, the R 22 is taken in two directions. One path takes the R 22 to the exhaust gas condenser heat exchanger 25. The second path takes the R 22 to the engine jacket water heat exchanger 26. It is optimal to maintain a constant 205° F. return water temperature to both the engine and exhaust gas condenser. These components are discussed in detail below.

To reduce the R 22 expansion system complexity, rather than using numerous thermal expansion valves in an attempt to regulate R 22 evaporation and expansion, a control system maintaining suitable liquid R 22 levels within the heat exchangers is used. This ensures sufficient flow of liquid R 22 for any load condition, and greatly reduces the potential for liquid carryover entering the recovery turbine inlet.

The R 22 exits from both the exhaust gas condenser heat exchanger 25 and engine jacket water heat exchanger 26, where it is directed to the recovery turbine inlet 27. The exact parameters of gas flow at this stage will be proportional to total system load. Design parameters of the turbine will dictate actual operating values. All of these design issues and factors are well within the capabilities of an individual of ordinary skill in the design of turbines.

In the preferred embodiment, the turbine has an inlet pressure of 300 (+300/−0) psia, and an inlet temperature of 205° F. (+250/−0). For example, regulation of engine and exhaust gas condenser return water temperatures is accomplished by controlling the number of first stage turbine nozzles cut in. This will also affect turbine outlet conditions, as discussed below.

By allowing first stage recovery turbine inlet nozzles to be cut in and out to regulate turbine inlet conditions, and because the turbine/generator speed is controlled by the diesel engine governor, there is no need for a turbine throttle control valve. This eliminates the introduction of throttle losses caused by use of such a valve. With the low levels of superheat associated with the use of R 22, eliminating throttle losses is an important turbine operating efficiency issue. The recovery turbine's efficiency in converting heat energy to mechanical energy is critical when low superheat operating fluids are utilized.

When dictated by the total capacity of the recovery turbine, and if a significant quantity of high temperature 'waste heat' flow is available, it may be desirable to further superheat the R 22 vapors before they enter the recovery turbine inlet fitting. For instance, a separate circuit could be introduced allowing the high temperature exhaust gas flow to raise the superheat value of the R 22 before the R 22 enters the recovery turbine. This would reduce the remaining amount of heat energy input to the exhaust gas condenser by the exhaust gas flow. This raises the heat value per unit mass available for conversion by the recovery turbine, and reduces ammonia subsystem requirements.

Continuing, the R 22 then moves through the recovery turbine 27. The recovery turbine is attached to the generator 10 and is designed to act as a second prime mover for the generator while the engine is running. This is necessary because the engine produces heat that is required by the heat recovery system and regulates the rotational speed of the generator. From the turbine inlet to exhaust, energy is converted along a line of constant entropy, whereby the now desuperheated R 22 exits the turbine annulus for the recovery turbine condenser 28.

Further, heat energy converted to mechanical energy and output from the recovery turbine, with electric power so generated and distributed, which in the end is reconverted to thermal energy by the electric power's distribution system losses and end use, is what creates the thermal energy sink for this system.

Without the existence of and connection to a thermal energy sink, the energy recovery and conversion system as described here can not operate. In essence, what is created by this system is a method whereby it is possible to remotely locate a thermal energy sink from the originating thermal energy source, using other than thermal conduits or mechanical means as the method of energy transmission to the remote location.

In the recovery turbine condenser, the now desuperheated R 22 exiting the recovery turbine is condensed by the evaporation of ammonia on the opposite side of the main condenser. A volumetric reduction of the R 22 from a slightly ($\leq 10\%$) saturated vapor state to a 90% saturated liquid state is caused by the removal of thermal energy from the R 22 vapors by the ammonia refrigeration system. The R 22 vapor flow across the condenser is ensured by the use of an R 22 compressor on the condensate, or low side of the condenser. This compressor is also used to control dynamically the precise temperature and pressure relationship within the recovery turbine annulus and condenser to optimize operating conditions of the recovery turbine and ammonia refrigeration systems.

The latent heat of condensation contained in the recovery turbine discharge vapors is transferred to the ammonia subsystem across the condenser. The ammonia subsystem is regulated to provide a $-20°$ F. $(+0/-10)$ condensing environment for the R 22 vapors. The latent heat of condensation and any remaining superheat contained in the exhausted R 22 is absorbed primarily by the ammonia subsystem, with the remainder contained in the R 22 compressor suction vapors.

Gravity, and/or physical constructs within the main condenser, causes the condensed R 22 to collect in the condenser. From there, the R 22 liquid pump W elevates the R 22 liquid pressure to 300 psia $(+150/-0)$. This creates a flow of cold R 22 liquid under pressure, from the collection point within the condenser to the next stage of the R 22 system. Energy used by this pump is imparted to the R 22 liquid. The R 22 liquid flow is now directed through a heat exchanger 29 that acts upon the liquid ammonia going to the condenser. The liquid ammonia is subcooled to near evaporator temperature by the $-15°$ F. liquid R 22. This increases the net refrigeration effect for a given amount of ammonia and returns some of the R 22 latent heat of condensation, removed by the ammonia's expansion, to the liquid R 22. The ultimate effect of this results in an increased R 22 flow rate through the recovery turbine.

The R 22 vapors drawn from the low side of the main condenser by the R 22 compressor are routed through submerged piping located within the chilled water reservoir. The heat energy removed from the water in this reservoir is transferred to the R 22 vapors exiting the condenser on their way to the inlet fitting on the R 22 compressor.

The R 22 vapors, after absorbing heat from the water in the chilled water reservoir, are now routed to another heat exchanger. This heat exchanger is only activated to limit the ammonia condensing temperature exiting from the evaporative condenser to a maximum temperature of $+100°$ F. At or below this temperature, no heat is withdrawn by the R 22 system from the ammonia liquid at this location.

At very high ambient temperatures, and at high ambient relative humidities, it may be desirable to use the R 22 compressor suction vapors outlet from the chilled water reservoir to absorb rejected heat directly from the main generator and other auxiliaries to the air within the thermodynamic boundary, rather than allowing this heat energy to simply join the intake air flow to the diesel engine.

This may be necessary to ensure adequate evaporation of water on the air side of the evaporative condenser. Insufficient water evaporation caused by high humidity will lower the amount of heat energy removed from the ammonia vapors as they pass through the evaporative condenser.

Very high ambient inlet air temperatures, when accompanied by very low relative humidity, may not allow for adequate cooling of the main generator and will cause excessively high ambient air temperatures within the system boundary. This condition may also require the re-sequencing of intake air system components to accommodate specific installations and environmental conditions.

All of this heat energy absorbed from the liquid ammonia, the chilled water reservoir, and other system components within the system's thermodynamic boundary is contained in the R 22 compressor suction vapors. The entire heat load from this subsystem, along with the energy imparted by the compressor's operation, is contained in the compressor discharge flow and is directed to the recovery turbine secondary inlet, at a nominal $+160°$ F. at 200 psia, or as may be required by recovery turbine design factors.

Here, the R 22 compressor discharge joins with R 22 flow from prior turbine stages. This secondary flow imparts its energy directly to the lower heat value vapor flow it mixes with, and the entire flow continues in the energy extraction/conversion done by the recovery turbine.

As the energy level input to the recovery turbine secondary inlet connection from the R 22 compressor increases, turbine exhaust vapor flow rate can increase by a significant factor. This tends to increase pressure within the condenser and turbine discharge annulus. This changes the percentage of R 22 condensed by altering the R 22 temperature and pressure relationship. Increasing R 22 pressure within the condenser causes additional low temperature R 22 compressor suction vapor flow. With an increase in this R 22 subsystem's capacity, it is more able to regulate the ammonia subsystem maximum condensing temperature, as well as increased ability to accommodate increased heat loads from the chilled water subsystem and environmental factors.

The Ammonia Refrigeration Subsystem

Figure 3:
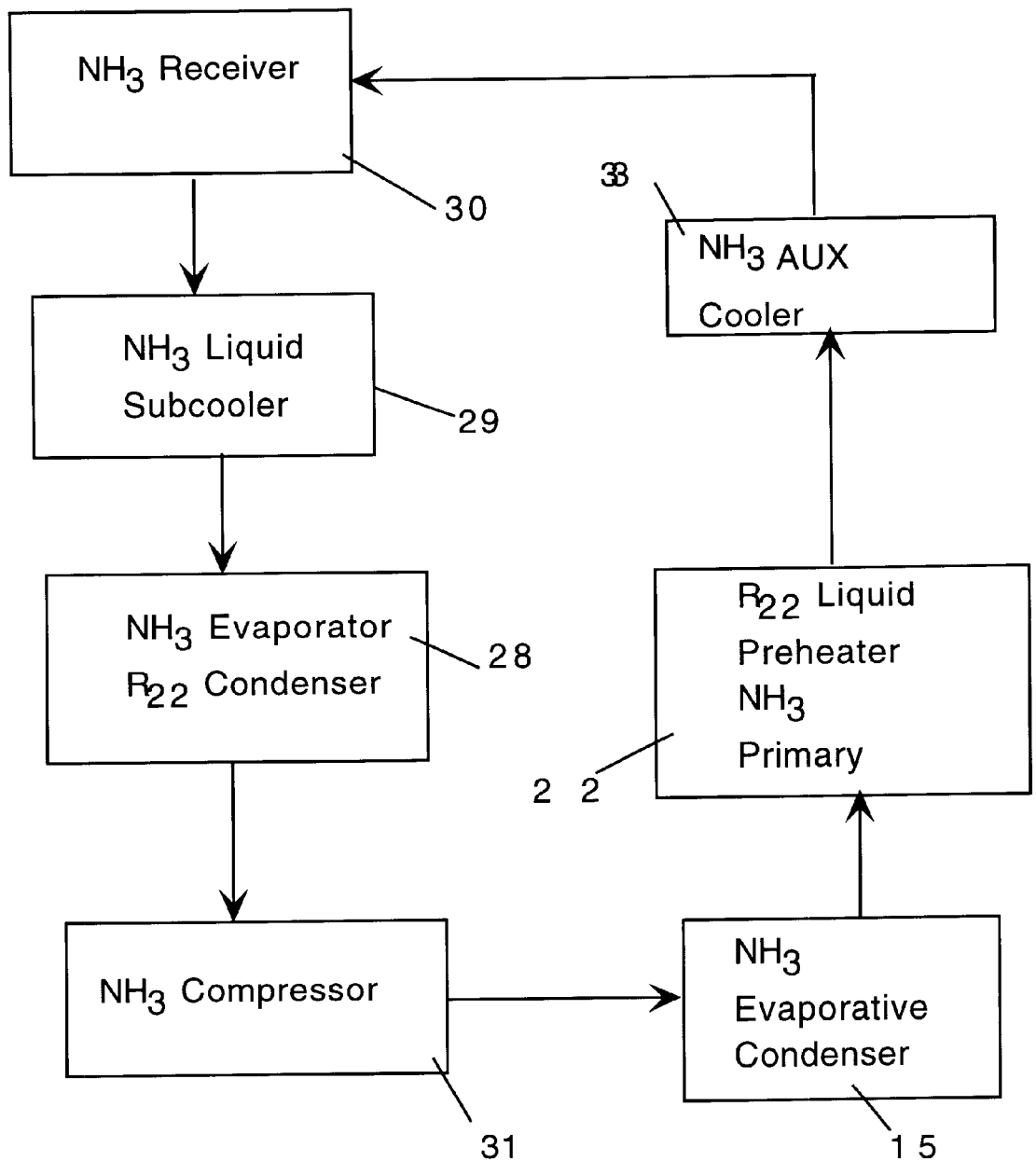
FIG. 3 is a schematic view of the ammonia subsystem.

Referring now to FIG. 3, the ammonia subsystem starts at the ammonia receiver 30, where liquid ammonia is stored. Design condensing pressure for the ammonia subsystem is 212 psia. This permits a condensing temperature of $100°$ F. The return of liquid ammonia to the receiver is ensured by the liquid ammonia pump S. This pump also ensures adequate ammonia liquid flow to the recovery turbine condenser. This pump is necessary to overcome friction losses caused by an increase in viscosity, when the liquid ammonia is subcooled in the following system element, and from other fluidic resistances on the liquid ammonia side of the condenser. Pump S imparts its energy to the ammonia liquid.

As discussed above, the warm liquid ammonia is routed through heat exchanger 29, with the warm liquid ammonia on one side, and the cold R 22 liquid being pumped from the condenser on the other. As stated previously, the cold R 22 liquid absorbs heat from the warm liquid ammonia, lowering the ammonia temperature, subcooling it to near $-15°$ F.

This improves the refrigeration efficiency per pound of the ammonia, while decreasing the refrigeration efficiency per pound of the R 22 system by adding the heat energy removed from the liquid ammonia to the liquid R 22. The ultimate effect of this results in an increased R 22 flow rate through the recovery turbine.

The ammonia liquid level within the condenser 28 is regulated rather than using conventional thermal expansion valves. This reduces the complexity and enhances the reliability and serviceability of the ammonia evaporation control system.

The evaporating ammonia extracts the latent heat of condensation from the R 22 vapors exiting the recovery turbine. Exiting the condenser, the ammonia vapors containing the latent heat of condensation of the R 22 vapors exhausted from the recovery turbine are drawn to the ammonia compressor suction 31. The ammonia evaporator temperature and pressure is controlled by regulating the ammonia compressor suction pressure. The heat removed from the R 22 vapors, along with the work done by the ammonia compressor, is contained within the vapor flow exiting the ammonia compressor.

The superheated ammonia vapor flow from the compressor discharge is now routed across the evaporative condenser, with the hot ammonia compressor discharge vapors on one side, and engine combustion intake air on the other.

The evaporative condenser, 15, transfers much of the latent heat of condensation contained in the ammonia flow to the combustion intake airflow, and acts as the primary ammonia condenser. Here the intake airflow of the diesel engine enhances evaporation of water on the air side of the evaporative condenser. This creates a refrigeration effect, lowering the temperature of the boundary between the air and ammonia sides of this device. This causes the heat contained in the ammonia vapors to be imparted to the evaporating water. This moisture, with it's entrained heat, joins the intake flow going to the diesel engine.

The R 22 liquid, at a pressure of 300 psia, leaves the R 22 receiver, and absorbs more of the latent heat of condensation contained in the ammonia flow, and here acts as a secondary ammonia condenser. By imparting the heat energy from the ammonia compressor discharge vapors to the liquid R 22, the R 22 refrigeration capacity per pound is further reduced. This increases the amount of R 22 required to remove sufficient heat from the engine jacket water and exhaust gas condenser heat exchangers. The ultimate effect of this results in an increased R 22 flow rate through the recovery turbine.

By transferring heat from the ammonia compressor discharge to the liquid R 22, any remaining heat energy that must be removed from the ammonia compressor discharge flow to accomplish complete ammonia condensation is greatly reduced.

In one embodiment, the saturated ammonia liquid leaving the secondary condenser is now routed to a heat exchanger 33 (see FIG. 3), with the saturated ammonia liquid on one side, and R 22 compressor suction vapors on the other. The R 22 suction vapors are used to anchor the ammonia liquid temperature to a maximum value of +95° F. by absorbing additional heat from saturated ammonia liquid exiting the secondary condenser. This ensures unsaturated, compressed liquid ammonia in the ammonia receiver. Any heat absorbed from the liquid ammonia by the R 22 suction vapors joins the flow entering the R 22 compressor. The R 22 compressor discharge then continues to the secondary R 22 inlet fitting of the recovery turbine for energy extraction and conversion.

The Chilled Water and Condensate Subsystem

Figure 4:
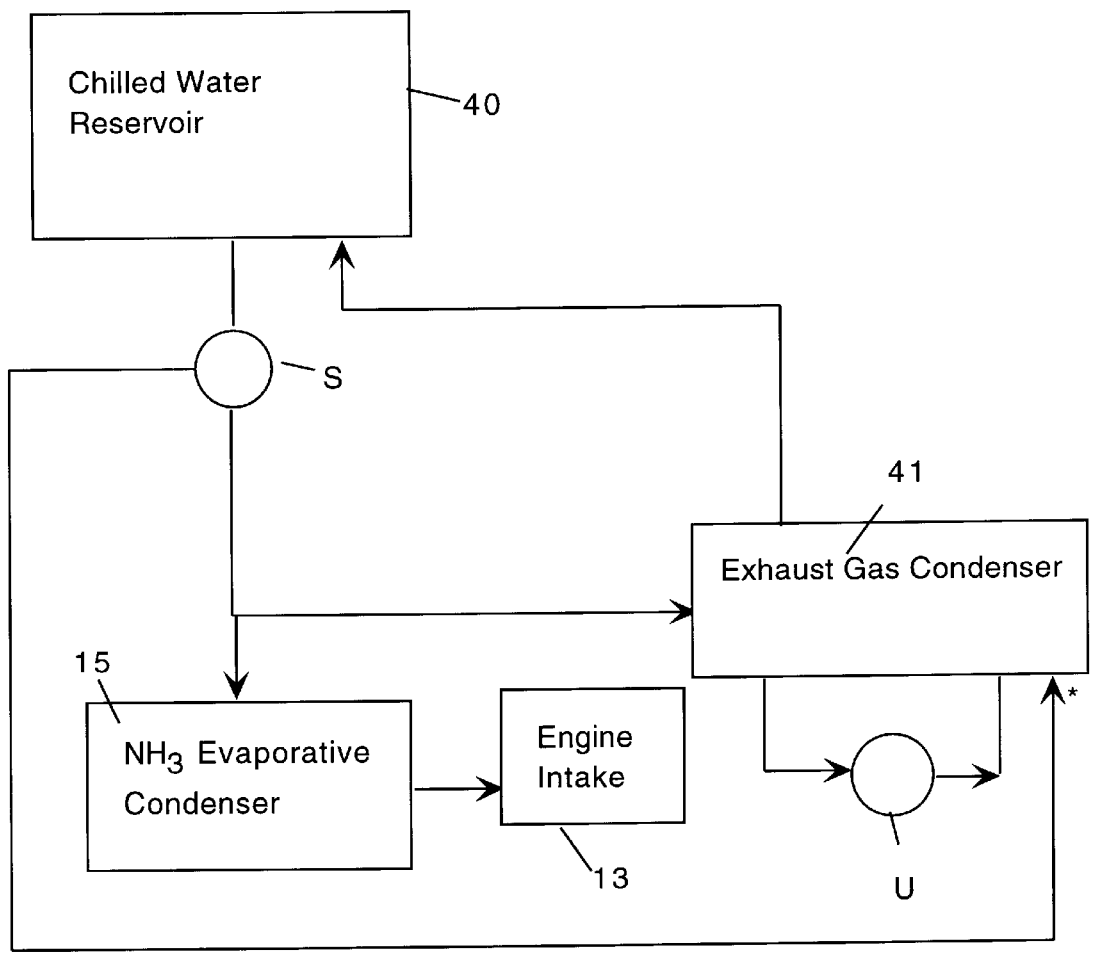
FIG. 4 is a schematic view of the chilled water subsystem.

Referring now to FIG. 4, the chilled water subsystem begins with the chilled water reservoir 40. Here, the water is treated as necessary to remove substances that would otherwise be vented to the atmosphere. These substances include atmospheric pollutants, suspended combustion byproducts, dissolved gasses, unburned petroleum products, and other noxious compounds.

The chilled water reservoir contains water that results from the condensation of the superheated steam contained within the engine exhaust gas flow. The superheated steam and other constituents contained in the exhaust gas flow are condensed and/or cooled to near ambient temperature (+65° F., ±5), at atmospheric pressure, by the exhaust gas condenser.

Heat energy is removed from the water in the chilled water reservoir by piping submerged in the reservoir. This piping is used to convey R 22 vapors from the condenser to the R 22 compressor. These cold suction vapors remove heat from the liquid in the reservoir to a suitable minimum temperature. The heat energy removed is conveyed to the R 22 compressor suction vapors, which continue on to the secondary input of the recovery turbine.

The water that is consumed by the evaporative condenser absorbs heat from the ammonia vapors on the ammonia side of the evaporative condenser. As discussed above, this water vapor, and the energy it contains, becomes part of the energy input to the diesel engine. Part of this energy input to the diesel engine is converted from heat energy to mechanical energy by the engine. Heat energy not converted to mechanical energy by the engine is rejected to the engine jacket water and the exhaust gas flow. These systems are further discussed in their respective sections elsewhere in this application.

Energy is converted by the mechanical actions of the engine, and is used to rotate a generator used to make electricity. Thermal energy not converted to mechanical energy by the diesel engine is recovered by the evaporation of R 22 in the engine jacket water and exhaust gas condenser heat exchangers. Further, many deleterious combustion byproducts can be recovered by the scrubbing action on the exhaust gas flow by the water streams within the exhaust gas condenser.

A pump Y is used to both circulate the water and raise the pressure for injection and spray nozzles within all but the last stage of the exhaust gas condenser. The pump also feeds several connections in the exhaust gas inlet connection, where water is injected directly into the exhaust gas flow. Here, the bulk of the latent heat of condensation contained in the superheated steam in the exhaust gas flow is absorbed by the water so injected. The heat energy removed from the exhaust gas flow is retained in the water within the exhaust gas condenser sump.

Within the exhaust gas condenser primary stages, water is supplied to numerous spray nozzles, arranged to increase droplet size at higher elevations within the condenser. The use of increasing droplet size improves coalescence of the water droplets, reducing moisture carryover to the final stage of the exhaust gas condenser.

In the last stage exhaust gas condenser, chilled water from the chilled water reservoir is used to recover the remaining heat energy contained in the exhaust gas flow through the exhaust gas condenser and to enhance precipitation of entrained water and other vapors.

Water in the exhaust gas condenser main sump is circulated by pump Y through a heat exchanger. Evaporating R 22 liquid is used to regulate water temperature returning to the exhaust gas condenser to ±205° F. This water is used to supply the various spray nozzles and injection nozzles, and then returns to the sump after absorbing heat energy from the exhaust gas flow.

Excess water resulting from condensing the superheated steam contained in the exhaust gas condenser primary stages overflows into the sump for the last stage of the exhaust gas condenser, where it mixes with precipitate from the last stage. As this liquid level increases, it spills into the chilled water reservoir. The energy contained in the spilled fluid raises the energy content in the chilled water reservoir.

The water in the reservoir is cooled by R 22 suction vapor flow through piping inside the chilled water reservoir, which transfers heat energy from the chilled water system to R 22 suction vapors en route to the R 22 compressor suction and other further uses as described elsewhere. Water within the chilled water reservoir may also be further processed to allow for domestic uses.

Any remaining unburned aromatic hydrocarbons contained in the exhaust gas flow can be condensed and recovered by appropriate means. Recovery of gasses dissolved in the high temperature water inside the exhaust gas condenser may also be extracted by appropriate means. This would prevent targeted substances from being released into the atmosphere.

The Engine Jacket Water Cooling Subsystem

Figure 5:
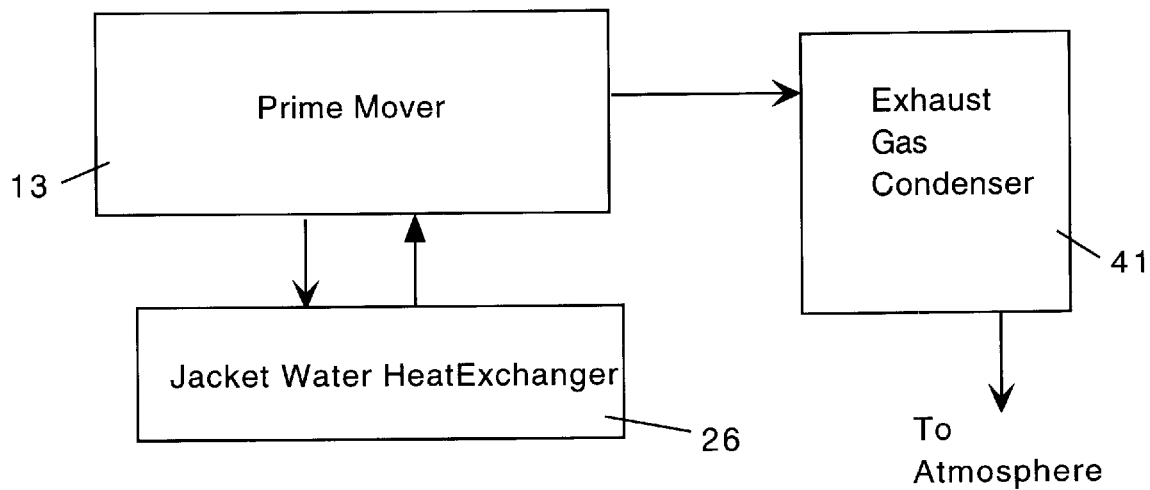
FIG. 5 is a detail view of the prime mover thermal subsystems.
Figure 6:
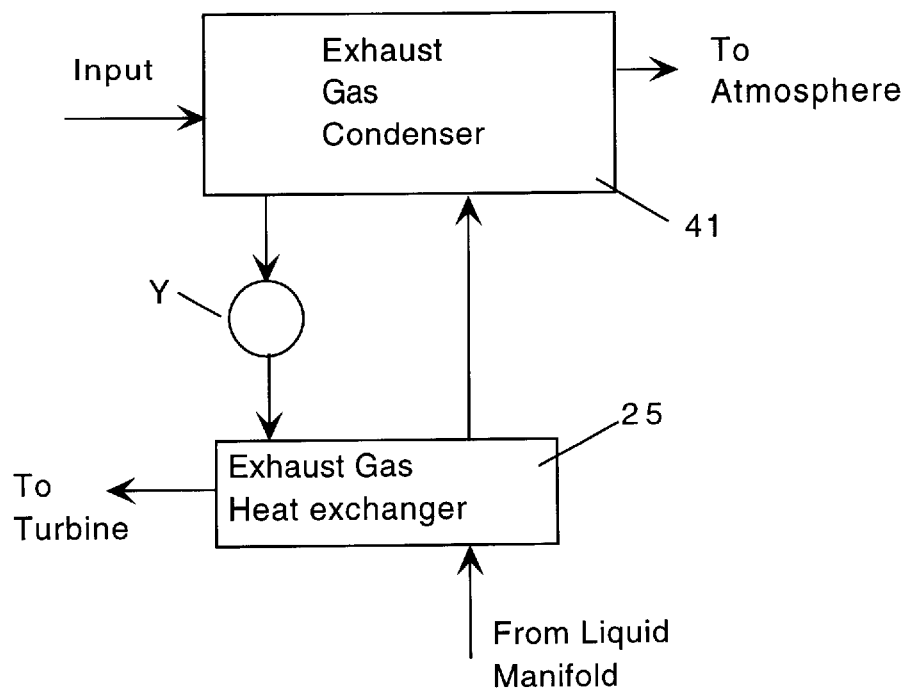
FIG. 6 is a detail view of the exhaust gas subsystem.
Figure 7:
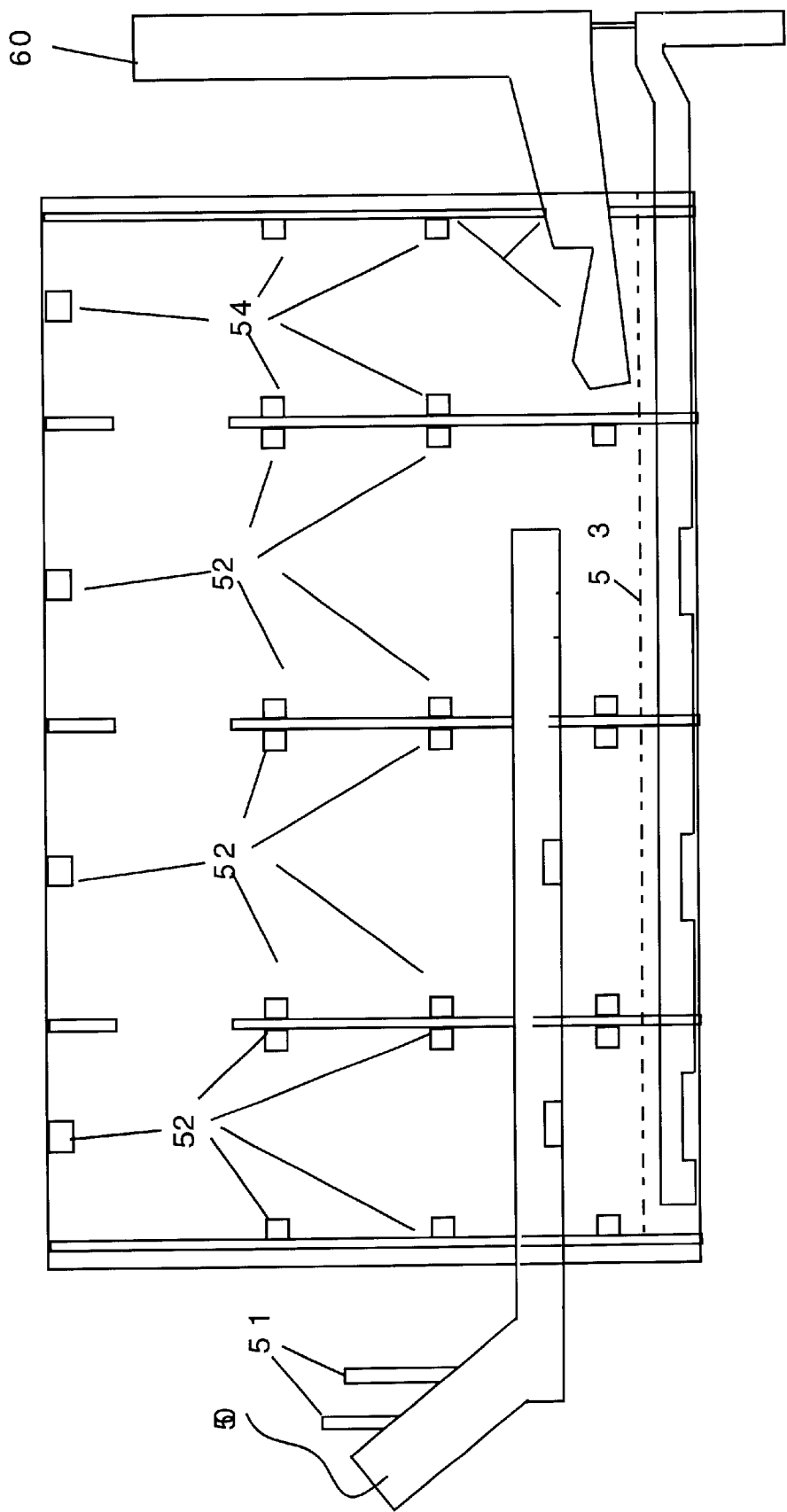
FIG. 7 is a detail view of the interior of the exhaust gas condenser.

Referring now to FIG. 5, the engine jacket contains about 35% of the total energy obtained by oxidation of fuel used by the prime mover 13. The engine uses a full flow cooling system, with thermostatic action closing one or more recirculation passages within the diesel engine's thermostat housing. As discussed above, R 22 is used to control engine jacket water inlet temperature at or above the thermostat's full open (minimum bypass) position.

This temperature is +205° F. nominal. Exceeding this temperature will raise the condensing temperature within the exhaust gas condenser. This will reduce the cooling capacity of the exhaust gas condenser primary stages. This results in inadequate heat removal from the exhaust gas flow in the primary stages of the exhaust gas condenser. The insufficient condensation of superheated steam contained in the engine exhaust flow may exceed the thermal capacity of the last stage of the exhaust gas condenser. This will result in inadequate condensation of superheated steam and unburned hydrocarbons, high final stage temperatures, and excessive moisture loss from the final stage of the exhaust gas condenser.

The Engine Exhaust Gas Subsystem

Referring now to FIG. 5, the prime mover generates an exhaust gas flow that contains about 30% of total energy input to the engine. This superheated exhaust flow is directed to the exhaust gas condenser 41.

The exhaust gas flow contains quantities of sulfur and nitrogen compounds, as well as unburned carbon and hydrocarbon compounds, and other particulate material. These noxious combustion byproducts can be recovered by the scrubbing action on the exhaust gas flow by the water streams within the exhaust gas condenser.

The exhaust gas condenser is designed with a large internal volume. This causes a significant reduction in the velocity of exhaust gas flow through the exhaust gas condenser.

There is a water sump in the bottom of the exhaust gas condenser. Pump Y is used to raise pressure to circulate the water. Here, water is circulated through a heat exchanger 25, which is used to evaporate R 22 for input to the recovery turbine. Evaporating R 22 liquid is used to regulate the water temperature sprayed into the exhaust gas flow to +205° F.

This water flow is then routed to spray nozzles within all but the last stage of the exhaust gas condenser as discussed, and then returns to the sump after absorbing heat energy from the exhaust gas flow.

Various size water droplets are used to progressively condense the superheated steam and cause the water vapor to coalesce and precipitate within the condenser. The use of increasing droplet size reduces moisture carryover to the final stage of the exhaust gas condenser.

Water is also routed to several connections in the exhaust gas condenser inlet connection. Here water is injected directly into the exhaust gas flow. Here is where most of the latent heat of condensation contained in the exhaust gas flow is extracted. This reduces the amount of energy required to be absorbed by the water from the spray nozzles within the primary stages of the exhaust gas condenser.

The now cooled exhaust flow then proceeds to the last of the exhaust gas condenser.

In the last stage of the exhaust gas condenser, chilled water from the chilled water reservoir is used to recover the remaining heat energy contained in the exhaust gas flow and to enhance precipitation of entrained water vapor. This water is sprayed from nozzles 52.

The primary intent of the last stage is to reclaim the maximum amount of heat energy remaining in the exhaust flow and to reduce to a minimum the moisture remaining in the exhaust flow before it is vented to the atmosphere. This can also enable condensing of remaining aromatic hydrocarbons and petroleum products from the exhaust gas flow, with recovery by appropriate methods.

Excess water resulting from condensing the superheated steam contained in the exhaust gas flow overflows into sump 53 of the last stage of the exhaust gas condenser, where it mixes with precipitate from the last stage. As this liquid level increases, it spills into the chilled water reservoir 40. The energy contained in the spilled liquid raises the energy content in the chilled water reservoir.

The cooled exhaust gas is then vented to the atmosphere at the end of the exhaust gas condenser through exhaust vent 60. This completes the exhaust cycle of the system.

Alternative embodiments and materials may be used with this system. For example, depending on specific needs of the user, it may also be desirable to use lower quality heat, extracted from a suitable location within the system herein described, to provide for various heating needs. It is also possible to use excess refrigeration capacity to perform cooling service for domestic, industrial, and other uses.

As an adjunct to the ammonia subsystem as described, it is possible to use other refrigerants with properties that will allow other direct uses of the thermal energy removed from R 22 condensation in the condenser. For example, propane can be used as a refrigerant. Other substances can be substituted for the propane here described, that may be less volatile yet perform similar functions at similar pressure temperature relationships. Used as a condensing stage for the ammonia compressor discharge, propane allow a high condensing temperature ($\geq$+250° F.) permitting both direct expansion of R 22 liquid supplying the recovery turbine, and increasing the superheat of the recovery turbine R 22 inlet flow, thereby allowing additional energy conversion/extraction within the recovery turbine.

The condensing temperature pressure relationship of the propane would be regulated to allow for $\geq$80 percent saturated liquid propane at nominal R 22 vapor discharge temperature (+205° F., +5/−0) from the engine and exhaust gas heat exchangers. This maximizes the heat energy transfer to the R 22 expanding in the propane heat exchanger.

The heat remaining in the liquid propane leaving this heat exchanger would then be used to preheat liquid R 22. The ultimate effect of this results in an increased R 22 flow rate through the recovery turbine.

This configuration allows maximum heat transfer to the recovery turbine inlet with a minimum of parasitic system requirements to recover the remaining thermal energy contained in the propane. This configuration could also be used to eliminate the need for the evaporative condenser as a necessary component, but the benefits realized by hydrating engine intake air (reduced nitrous oxides in exhaust gas flow, improved thermal efficiency of diesel engine, reduced exhaust gas flow volume through exhaust gas condenser, lower exhaust gas flow temperature, etc.) would be lost.

It is also possible to elevate the discharge temperature/pressure relationship from the main ammonia compressor to allow a method of operation similar to that described above. While possible, this would elevate the ammonia compressor's discharge temperature and pressure to a point where equipment longevity and reliability could be significantly reduced.

Figure 8:
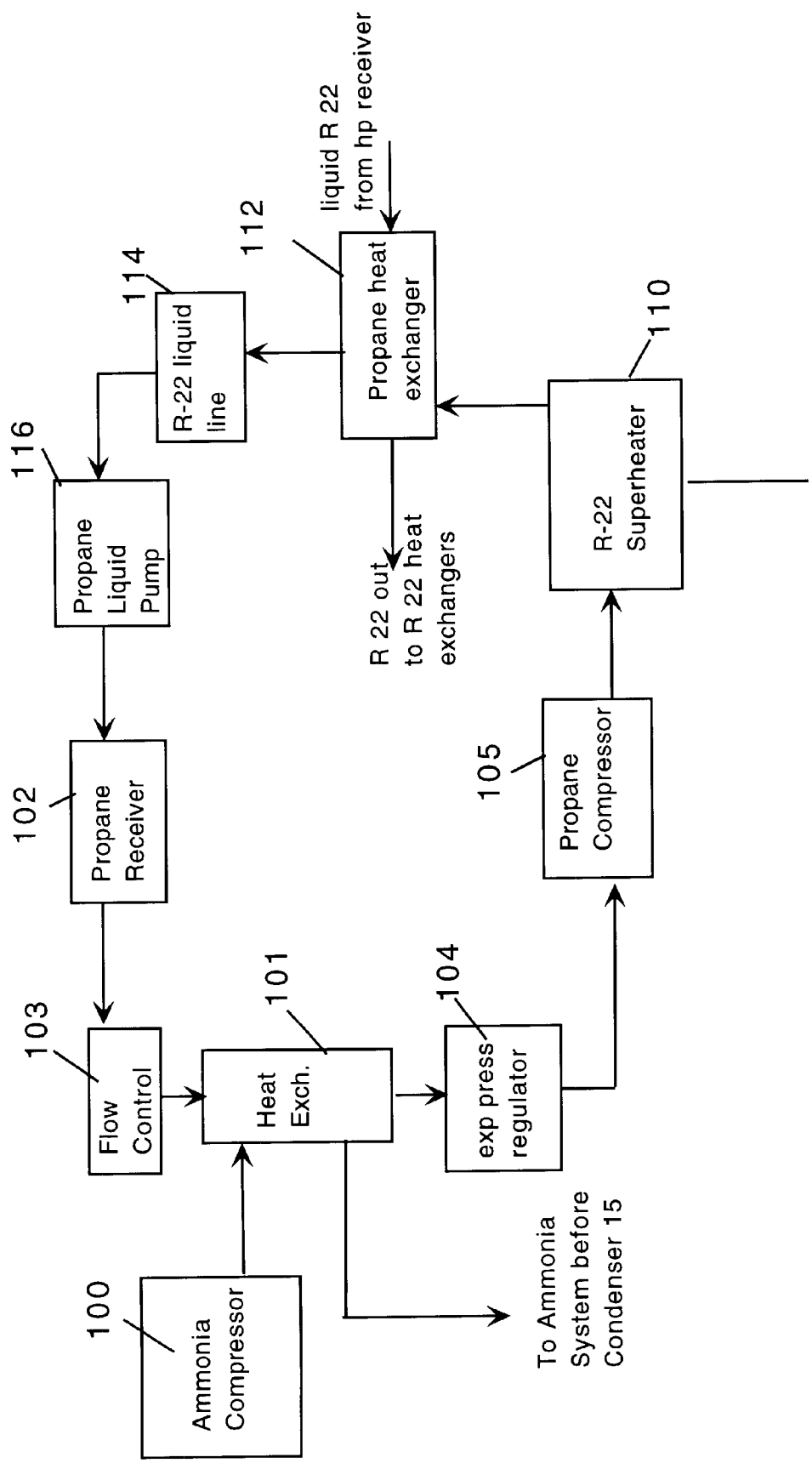
FIG. 8 is a schematic view of the second embodiment, showing the propane auxiliary system.

Referring to FIG. 8, the second embodiment's components are shown. The discharge from the ammonia compressor 100 is routed through a heat exchanger 101. Liquid propane leaves the propane receiver 102 for this heat exchanger 101. In heat exchanger 101, the liquid propane evaporates and absorbs heat from the ammonia compressor discharge. Propane flow is regulated by flow control 103 to an appropriate level within this heat exchanger. The precise vapor pressure of the evaporating propane may be controlled by using an optional expansion pressure regulator 104. This pressure regulator would be located between the heat exchanger here described and the propane compressor suction, as shown. Pressure regulator 104 would then control the ammonia compressor discharge temperature and pressure to design values and maximize the superheat value of the now vaporous propane.

The ammonia compressor discharge, now a saturated liquid, re-enters the ammonia system before the (secondary) ammonia condenser 15 (see FIG. 3), and then continues on as described in the first embodiment.

The vaporous propane is now directed to the propane compressor suction. The heat removed from the ammonia compressor discharge, contained in the propane vapor, is drawn into the propane compressor 105. Here the propane vapor pressure and temperature relationship changes. The energy used to compress the propane is contained within the propane compressor discharge flow.

Because of the quantity of energy removed from the ammonia compressor discharge by evaporation of the propane, the heat load originally destined for the ammonia evaporative condenser is significantly reduced. This can replace the function performed by the evaporative condenser for the ammonia subsystem.

The superheated propane is then directed to the R 22 superheater 110, where the propane imparts energy to the recovery turbine inlet flow. This lowers the temperature of the superheated propane vapor. Next, the propane flow is directed to the propane heat exchanger 112 where R 22 liquid is evaporated to condense the propane. The R 22 flow from this heat exchanger then combines with the R 22 vapors exiting the engine and exhaust gas condenser heat exchangers before entering the R 22 propane superheater. This lowers the temperature of the propane to around +205° F.; ensuring ≧80 percent saturated liquid. Finally, the saturated propane liquid is then routed through a heat exchanger 114 located in the R 22 liquid flow line just prior to the high pressure R 22 liquid receiver. Here, the propane gives up heat to the R 22 liquid. The ultimate effect of this results in an increased R 22 flow rate through the recovery turbine.

The now condensed liquid propane then goes to a pump 116 where it's pressure is raised, and is then stored in the propane liquid receiver 102.

As noted above, it is possible to use this system to augment heating and cooling uses outside the operation of this system. In these cases, the preferred points of extraction for these external connections are:

a) for heating needs below +95° F., use the exhaust gas condenser main sump, the ammonia compressor discharge, or the liquid propane before the R 22 liquid preheater;

b) for cooling needs to −10° F., use the R 22 liquid leaving the main R 22 condenser after the pump, the ammonia compressor suction, or the R 22 compressor suction at the connection to the main condenser before the chilled water reservoir;

c) for cooling needs below +65° F. to maximum temperature of +100, use the R 22 liquid leaving the main R 22 condenser after the pump, the ammonia compressor suction, the R 22 compressor suction at the connection to the condenser, or the chilled water reservoir.

Referring now to FIGS. 9–12, another embodiment adapts the invention to a convention steam-turbine generation system is shown. Most large-scale electric generation plants use fossil fuel or nuclear generated steam to turn turbines used to generate electricity. While the primary focus of this embodiment is fossil fuel plants, a similar system recovering the latent heat of condensation from steam generated by nuclear means is, in essence, identical to the applicable section(s) as herein presented.

There are two subsystems in this design, which will be discussed separately for the sake of clarity. The first subsystem is the interface element. This is where heat energy is collected and made available to improve the thermal efficiency of the conventional steam plant, and for further use by the recovery and conversion element. The second subsystem is the recovery and conversion element. This is where heat energy collected by the first element, beyond that which is used to improve the thermal efficiency of the conventional steam plant, is converted from heat energy to mechanical energy for further use.

As in the first two embodiments, the entire system is enclosed within a thermodynamic boundary, with combustion air and fuel admitted. Electric power, exhaust gas flow cooled to near ambient, water, remnants of the combustion process, and sound and vibration exit the boundary.

FIGS. 9–12 are block diagrams showing the main components of the integrated systems. The block diagrams are labeled with the component names and are cross-referenced in places where thermal energy is transferred from one system or location within a system to another.

As shown in the figures, there are eight subsystems in this embodiment. There is an R 22 system, a high temperature refrigerant system, a recovery turbine ammonia system, a steam condensing system, a boiler feed water system, a chilled water system, an exhaust gas condensing system, and a combustion air system.

Figure 9:
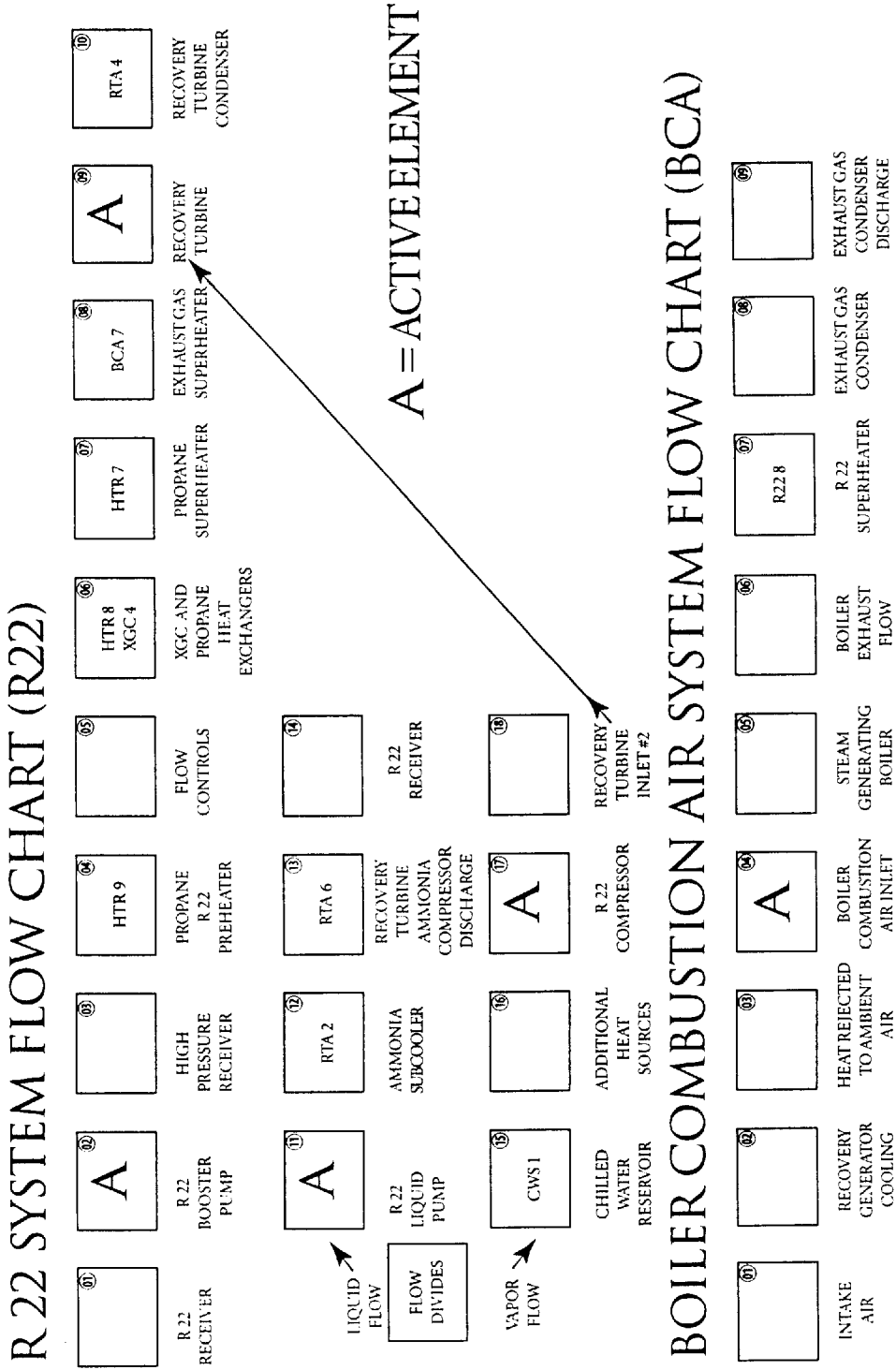
FIG. 9 a block diagram of the R 22 system components in the third embodiment.

Referring now to FIG. 9, the components of the R 22 system are identified. The R 22 flows through the system as follows: We begin with the R 22 liquid stored in the R 22 receiver. It is moved from the receiver using a booster pump, to a high pressure receiver. It then flows through a preheater, a flow control system, followed by heat exchangers for the exhaust gas condenser and propane systems. From there, it moves through the propane superheater, then the exhaust gas superheater. It then enters the recovery turbine, where heat energy is converted to mechanical energy. Exiting the turbine, the flow now proceeds to the recovery turbine condenser. As the vapors condense, the R 22 divides between a liquid flow and a vapor flow. The liquid is removed from the condenser proper by a pump. This pump is used to raise the pressure of the liquid R 22. The liquid R 22 then passes through the ammonia subcooler. Next, the liquid flow goes through a heat exchanger that acts as the primary recovery turbine ammonia condenser. The liquid R 22 then returns to the R 22 receiver to begin the cycle again.

R 22 vapor flow is drawn through the recovery turbine condenser by the R 22 compressor. The vapor flow leaving the condenser is routed through the chilled water reservoir, where heat is removed from the water in that reservoir. Additional heat sources may be included at this point, before passing to the R 22 compressor suction. This R 22 flow is routed to a recovery turbine secondary inlet, where it joins the flow from prior turbine stages. This flow then continues through the recovery turbine, and continues the cycle as described above.

Figure 10:
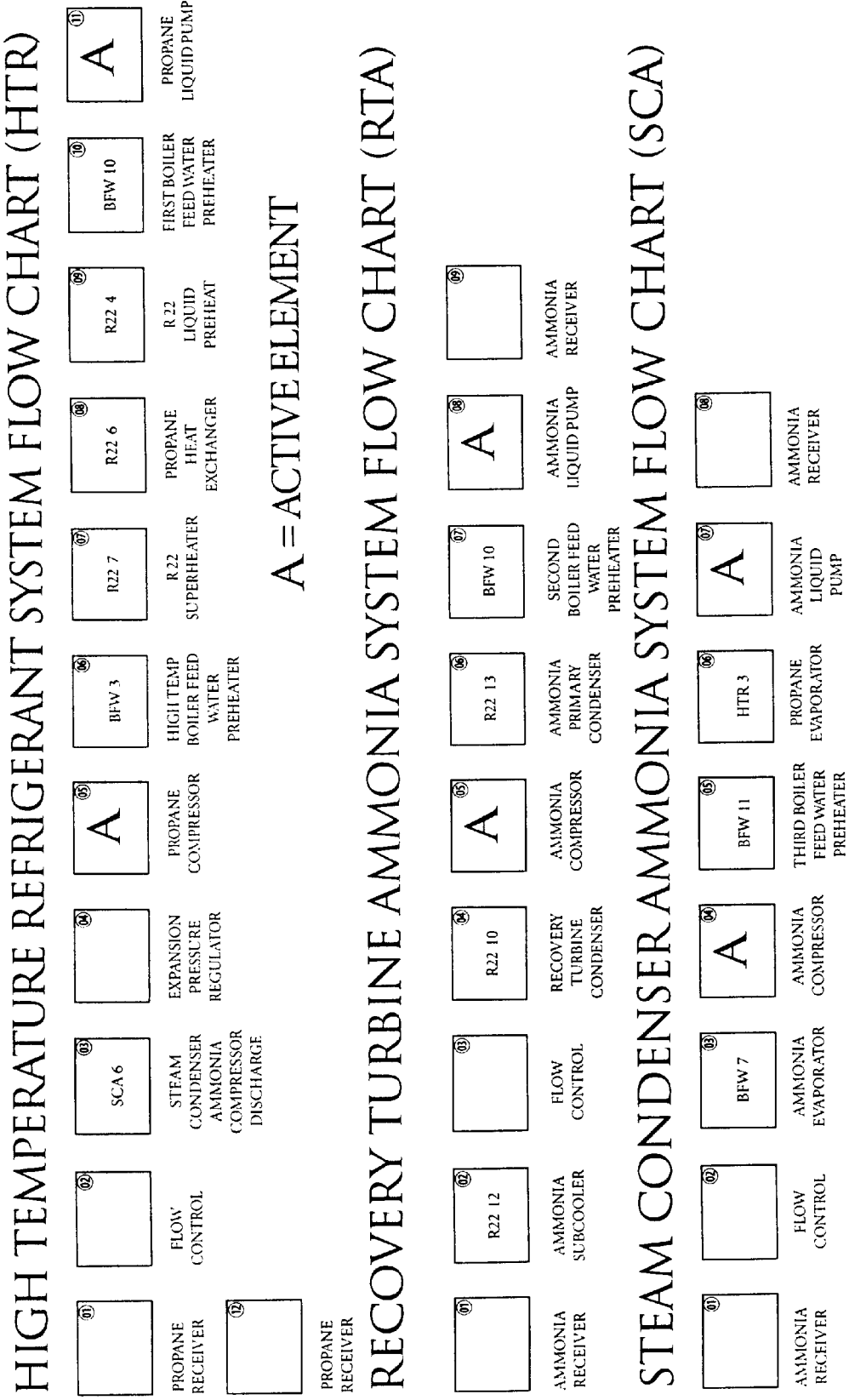
FIG. 10a block diagram of the high-temperature refrigerant system, the recovery turbine ammonia flow, and the main steam condenser ammonia systems components in the third embodiment.

The high temperature refrigerant system components are shown in FIG. 10. The cycle begins at the propane receiver. Liquid propane leaves the receiver, goes through a flow control device, and enters a heat exchanger where it removes heat from the steam condenser ammonia compressor discharge. The propane then moves through an optional expansion pressure regulator before entering the propane compressor. The propane compressor changes the pressure and temperature relationship of the propane, which is then routed to the high temperature boiler feed water preheater. Next, the flow goes through the R 22 superheater, the propane heat exchanger, and the R 22 liquid preheater before passing through the first boiler feed water preheater. After that, the now liquid propane is pressurized and transferred by a pump to the propane receiver to begin the cycle again.

FIG. 10 also shows the components for the recovery turbine ammonia system. This system begins at the ammonia receiver. It leaves the receiver and goes through a subcooler, then passes through a flow control device before entering and expanding within the recovery turbine condenser. The vapor flow is then drawn to the ammonia compressor, where the pressure and temperature relationship is changed. Leaving the compressor, the flow then goes through the ammonia primary condenser. Remaining heat is released in the second boiler feed water preheater. The now liquid ammonia is routed to a pump, where its pressure is raised before it returns to the ammonia receiver to begin the cycle again.

Figure 11:
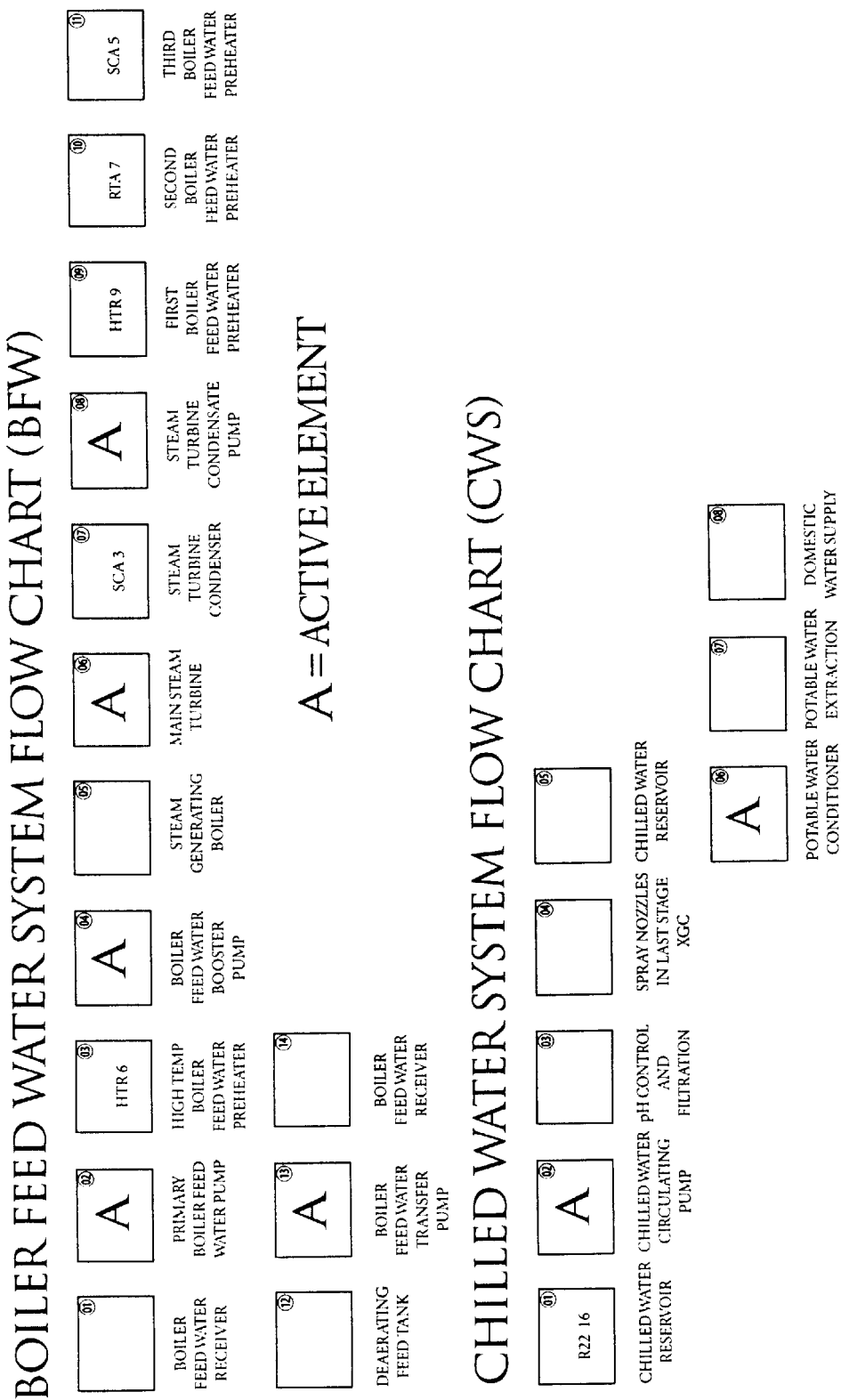
FIG. 11 a block diagram of the boiler feed water and chilled water systems components in the third embodiment.

FIG. 11 shows the steam condenser ammonia system. This system begins at the ammonia receiver. Leaving the receiver, the ammonia goes through a flow control device before entering and expanding within the steam turbine condenser. Leaving the condenser, the flow is routed to the ammonia compressor suction, where the ammonia pressure and temperature relationship is changed. Leaving the compressor, the flow then goes through the third boiler feed water preheater, where heat is transferred to the boiler feed water. From here, the ammonia vapors are routed to the propane evaporator, where heat contained in the ammonia compressor discharge is used to evaporate liquid propane. The now liquid ammonia is routed to a pump, where its pressure is raised before it returns to the ammonia receiver to begin the cycle again.

Figure 12:
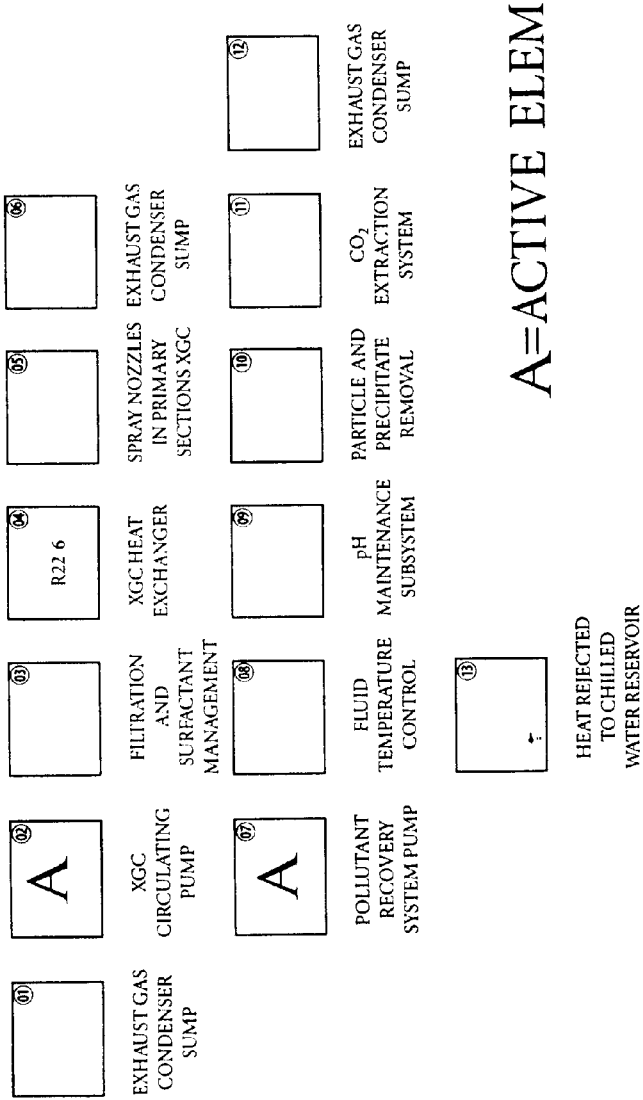
FIG. 12 a block diagram of the exhaust gas condenser water system components in the third embodiment.

FIG. 12 shows the boiler feed water system components. This system begins at the boiler feed water receiver. The feed water is moved by a pump to the high temperature boiler feed water preheater, through the high pressure booster pump, then to the steam generating boiler, where it is heated and changed to steam before passing to the main steam turbine. This steam then moves through the steam turbine and condenser, where it gives up heat energy. From the condenser, the condensate pump causes the boiler feed water to flow through the first, second, and third boiler feed water preheaters. Next, the boiler feed water goes to the deaerating feed tank, then by another pump to the boiler feed water receiver, to begin the cycle again.

FIG. 11 also shows the chilled water system components. In this system, the cycle begins at the chilled water reservoir. The water is moved by a circulating pump through a pH control and filtration station before supplying spray nozzles in the last stage of the exhaust gas condenser. This water, along with excess liquid from the first stages of the exhaust gas condenser, returns to the chilled water reservoir, where it raises the temperature of the water in the reservoir.

FIG. 12 shows the components of the exhaust gas condenser water system. Here, the system begins at the exhaust gas condenser sump. Water is moved by a pump to a filtration, pH control, and surfactant management station before moving to the exhaust gas condenser heat exchanger. Water leaving the heat exchanger is sprayed from injectors and nozzles into the exhaust gas flow within the primary sections of the exhaust gas condenser, where the water cools and condenses the exhaust gas flow. The water then collects in the exhaust gas condenser sump to begin the cycle again. The water, and the combustion by-products suspended in it, can be further treated. In a parallel system, water from the exhaust gas condenser sump is moved to a pollutant recovery system, by a pump, through a fluid temperature control, a ph maintenance station, a particle and precipitate removal station, and a $CO_2$ extraction system before returning the water to the exhaust gas condenser sump.

FIG. 9 also shows the boiler combustion air system, which operates as follows: As in the first two embodiments, combustion air entering the system is directed through the recovery turbine's generator. Here, combustion air absorbs heat from generator resistive, hysteresis, and windage losses.

Combustion air is then allowed to permeate within the boundary, where it absorbs heat rejected to the environment by enclosed components. As a practical matter, effort needs to be made to reduce radiant heat rejected to the environment within the thermodynamic boundary. This can be done by mechanical means, by insulating system components. By incorporating this low level heat energy that is usually wasted to ambient into the boiler intake air stream, total system thermal efficiency is enhanced. All of the energy contained in the combustion air becomes part of the energy input to the boiler.

Most boiler installations include devices that use exhaust gas flow to preheat boiler feed water and or combustion air. With the higher combustion air temperature entering the boiler because of rejected heat to combustion air flow as described above, less heat energy will be removed from the exhaust gas flow in this manner.

Also, because heat energy contained in the boiler exhaust gas flow is no longer simply released to the atmosphere and lost, changes to normal operating parameters may be advantageous. Maximum gas temperature for maximum superheat temperature for highest steam turbine system efficiency, with the associated increase in exhaust gas flow pollutants, may no longer be the most economical operating model, when using this system.

After combustion of the fuel and the subsequent passage through the boiler and other devices located in this flow, exhaust gas flow is then directed to the exhaust gas condenser. Here, through actions carried out upon the exhaust gas flow by and within the exhaust gas condenser, remaining heat energy in the exhaust flow is recovered by heating the water circulating inside the exhaust gas condenser. See FIG. 12.

If the biomass used to fuel the boiler contains hydrogen or if significant moisture is present, the energy contained in the superheated steam that becomes part of the exhaust gas flow is also recovered. Particulate matter and noxious gasses can be removed from the exhaust gas flow, along with specific targeted compounds such as carbon dioxide, sulfuric acid, nitric acid, and others, within the exhaust gas condenser by suitable means.

The heat energy contained in the exhaust gas flow is absorbed by water circulated within the exhaust gas condenser. The heat contained in this water is used to evaporate R 22, which cools the water in the exhaust gas condenser. The evaporated R 22 is the operating fluid used by the recovery turbine. The exhaust gas flow is cooled to near ambient temperature before discharging to the atmosphere in the last stage of the exhaust gas condenser. See FIGS. 9 and 11.

Next, the heat energy contained in the steam turbine discharge vapors is recovered and made available to both improve the thermal efficiency of the main steam system and to supply energy to the recovery turbine, by the use of a multistage refrigeration system.

As in the previous embodiments, the first stage of this system is embodied as an ammonia refrigeration system. Here, ammonia is evaporated to maintain a steam turbine condensing temperature of around +65° F. For example, to facilitate retrofitting existing plants, this ammonia system could be embodied as a conventional water chiller, supplying the steam turbine condenser with the proper quantity and temperature condensing water to permit proper operation of an existing steam plant.

The ammonia compressor draws in the superheated ammonia vapors resulting from either direct cooling of the steam turbine discharge vapors or by cooling water used to condense the steam, and compresses this vapor. This changes the ammonia's pressure and temperature relationship, with a resulting compressor discharge temperature of around +120° F. Energy used by the ammonia compressor to affect this change is contained in the ammonia compressor discharge flow.

The energy level at this temperature is, in general, too low to allow for efficient conversion of heat energy to mechanical energy, primarily because of excessive flow rates caused by low energy densities. However, it can be put to effective use first by preheating the boiler feed water (main condenser condensate).

The condensate (boiler feed water) from the steam condenser is pumped from the collection point within the condenser to a heat exchanger. After absorbing low level heat energy from three sources, the hot ammonia compressor discharge vapors are routed to a heat exchanger, where additional heat, this time from the ammonia compressor discharge vapors, is transferred to the cold boiler feed water. This preheats the boiler feed water, returning some of the latent heat of condensation to it. This improves the efficiency of the boiler, because it then requires less heat energy to convert the feed water to steam. The energy used by the pump to create a flow is contained in the fluid being pumped.

Next, boiler feed water is further heated to a higher temperature. Because the boiler feed water at this point (before the deaerating feed tank) is nominally at atmospheric pressure, it is not useful to heat this fluid close to the boiling point. The latent heat of condensation of steam at +68° F. is about 1000 BTU per pound. Each pound of water, if raised from 68° F. to 210° F., would require 142 BTU. This accounts for only about 14% of the energy recovered by condensing the steam exiting the steam turbine, with considerable heat energy yet remaining in the ammonia and propane compressors' discharge flows.

After being heated by the steam condenser ammonia compressor discharge flow, the boiler feed water is at a temperature of +120° F. To facilitate maximum efficiency in the deaerating feed system, the boiler feed water can be further heated to an optimum value by absorbing heat from the high temperature propane exiting the R 22 superheater.

Similar to the second embodiment, a second stage of refrigeration is used to condense the remaining hot ammonia compressor discharge vapors, and with a concomitant increase in the secondary system's compressor discharge temperature, high quality heat energy is obtainable. Such a system is described below.

The second stage is embodied as a refrigeration system using propane as the operating fluid. The propane is evaporated in the process of cooling and condensing the ammonia compressor discharge. Energy used by the propane compressor to affect the change in the pressure and temperature relationship is contained in the propane compressor discharge flow. Propane condensing temperatures between +250 and 450° F. are conveniently available, with associated high superheat values at these temperatures. This embodiment uses a nominal propane condensing temperature of +302° F.

The resulting high temperature propane vapors are used to heat several fluids, in a particular order, for best use.

Referring now to FIG. 10 and the equations in FIG. 13, after the boiler feed water leaves the deaerating feed tank, it's pressure is increased to an intermediate pressure as defined by the boiler operating pressure. In this embodiment, the feed water is heated to a temperature of 281° F. by the high temperature propane vapors, while at a pressure of 50 psia. The feed water, heated to this temperature, under this pressure, undergoes a partial change of physical state (a phase change) from a compressed liquid state to a saturated vapor state.

This returns more of the latent heat of condensation from the main steam condenser back to the boiler feed water, and can result in a significant reduction in the amount of energy required to reconvert the boiler feed water to steam.

Heating boiler feed water, at a pressure of 50 psia, with high temperature propane, to a temperature of approximately 281° F., will create a 20% saturated liquid state of the boiler feed water, with a new heat content of 435 BTU/lb. Increasing the pressure of this saturated fluid to 550 psia. by the use of a positive displacement pump (or pumps), such as a screw type feed water pump, will result in an increase in temperature of the water at the pump discharge to 476° F., with a further increase in energy level of approximately 25 BTU/lb. imparted to the fluid by the pumping action. Under these conditions, the feed water will phase change along a line of constant entropy from a saturated liquid to a compressed liquid state.

This happens because, at the higher pressure and at the specified energy level, the feed water can only exist in an unsaturated (compressed liquid) state. The latent heat of condensation of the saturated vapor portion, upon recondensing at the higher pressure, imparts this heat energy to the parent fluid, raising the temperature of the parent fluid. This change occurs along a line of constant entropy, and is a reversible (adiabatic) process.

For example, a cylinder contains the feed water to be heated, at a beginning temperature of 120° F., pressure of 50 psiag, and an energy level of about 88 BTU/lb. At the bottom of the cylinder, reside heating coils that contain the high temperature propane at a temperature of about 300° F. Feed water enters the cylinder from below the heating coils, where the flow is diffused for even heating.

At the top of the cylinder resides a screw type positive displacement pump. Steam bubbles generated by thermal contact with the hot propane are entrained in the liquid, creating a 20% saturated liquid. The bubbles rise upward along with the heated liquid flow compelled by the screw pump operation.

The opacity of the saturated fluid can be used to determine the percentage of saturation, also by observing the change in sonic transmission characteristics, as can the final feed water temperature leaving the screw pump. Comparative flow rates between the propane and feed water could also be used for this purpose.

Operating clearances within the pump are small, such that the fluid being pumped provides sufficient barrier between the rotors and housing to ensure proper sealing action. The pump raises the fluid to a high pressure, above that at which the fluid at the final pressure can exist as a saturated liquid, when considering the energy imparted to the liquid by the condensing steam bubbles and energy imparted to the fluid by the pump.

Because the steam bubbles entrained in the feed water recondense in the high pressure area on the discharge side of the pump, there are no steam bubbles present where the pump rotors mesh. Hence, there will be no cavitation or other damage to the rotor surfaces, because no low-pressure area is created by pump operation in the manner put forward.

In this embodiment, the final pump pressure is approximately equal to the steam generator discharge pressure.

After the propane vapors lose significant high quality heat in the high temperature feed water preheater, the flow then enters the R 22 superheater. Here the energy level of the R 22 is raised to a maximum value, relative to the propane compressor discharge pressure, temperature, and relative flow rates.

Remaining heat energy is then used to evaporate R 22 liquid for the recovery turbine in the propane heat exchanger, then to preheat liquid R 22 before expansion in the exhaust gas condenser and propane heat exchangers. Next, the propane liquid flows through the second boiler feed water preheater, giving up the bulk of the remaining heat energy it contains. This reduces the temperature of the propane liquid to a low level, minimizing the flow rate of the propane system, maximizing the propane refrigeration system efficiency.

The superheated R 22 exits the propane superheater and moves to the exhaust gas superheater. This device is located in the boiler exhaust gas flow just before the exhaust gas condenser. Here, the R 22 is further heated, to a maximum temperature below that at which it will decompose chemically, and is then directed to the recovery turbine main inlet connection.

By using a series of superheaters to raise the energy level input to the recovery turbine, the most efficient use of existing high quality heat is realized, while lowering support requirements for lower level energy recovery methods. This optimizes the use of available heat energy at multiple levels.

Further, heat energy in the form of steam extracted from the steam turbine, conventionally used for boiler feed water preheating, may no longer be the most economical operating model when using this system. This could allow for full expansion of the entire steam flow within the steam turbine.

Reheating of steam in one or more secondary turbine stages, using recovery system energy, by radiating elements installed within the steam turbine between stages, or in a more conventional remote heating arrangement, can further improve the total energy extracted per pound flow through the steam turbine.

In this embodiment, the superheated R 22 vapors created in the prior stage are directed to an axial turbine of conventional design. Here, the R 22 vapors are used as the operating fluid by the turbine, where heat energy is converted to mechanical energy along a line of constant entropy. After expansion, the now desuperheated R 22 vapors exit the recovery turbine annulus for the recovery turbine condenser.

The recovery turbine is operated in a free running manner, using generator synchronicity to regulate its speed closely. This method of operation eliminates throttle losses, which can be significant with operating fluids having relatively low superheat values. Work output from the recovery turbine shaft can vary over a wide range as the heat energy input to the turbine varies.

In the recovery turbine condenser, the now desuperheated R 22 exiting the recovery turbine is condensed by the evaporation of ammonia on the opposite side of the recovery turbine condenser. A volumetric reduction of the R 22 from a 10% saturated vapor state to a 90% saturated liquid state is caused by the removal of thermal energy from the R 22 vapors by an ammonia refrigeration system.

R 22 vapor flow across the recovery turbine condenser is ensured by the use of an R 22 compressor on the condensate, or low side of the recovery turbine condenser. This compressor is also used to control dynamically the precise pressure and temperature relationships within the recovery turbine annulus and recovery turbine condenser to optimize operating conditions of both the recovery turbine and ammonia refrigeration systems.

The latent heat of condensation contained in the recovery turbine discharge vapors is transferred to the ammonia subsystem across the recovery turbine condenser. The ammonia subsystem is regulated to provide a −20° F. (+0/−10) condensing environment for the R 22 vapors. The latent heat of condensation and any remaining superheat contained in the exhausted R 22 is absorbed primarily by the ammonia subsystem, with the remainder contained in the R 22 compressor suction vapors.

Gravity, and or physical constructs within the recovery turbine condenser, causes the condensed R 22 to collect in the recovery turbine condenser. From there, an R 22 liquid pump elevates the R 22 liquid pressure to 300 psia (+350/−0). This creates a flow of cold R 22 liquid under pressure, from the collection point within the recovery turbine condenser to the next stage of the R 22 system. Energy used by this pump is imparted to the R 22 liquid.

The R 22 liquid flow is now directed through a heat exchanger that acts upon the liquid ammonia going to the recovery turbine condenser. The liquid ammonia is subcooled to near evaporator temperature by the −15° F. liquid R 22. This increases the net refrigeration effect for a given amount of ammonia and returns some of the R 22 latent heat of condensation, removed by the ammonia's expansion, to the cold liquid R 22. The ultimate effect of this results in an increased R 22 flow rate through the recovery turbine.

Next, the R 22 liquid passes through a heat exchanger with the cold liquid R 22 on one side and the hot ammonia compressor discharge vapors on the other. Here, the liquid R 22 absorbs the latent heat of condensation contained in the ammonia compressor discharge flow, and acts as the primary ammonia condenser.

By imparting the heat energy from the hot ammonia compressor discharge vapors to the cold liquid R 22, the R 22 refrigeration capacity per pound is reduced. This increases the amount of R 22 required to remove the heat from the exhaust gas condenser and propane heat exchangers. The ultimate effect of this results in an increased R 22 flow rate through the recovery turbine.

The R 22 vapors drawn from the low side of the condenser by the R 22 compressor suction are routed through submerged piping located within the chilled water reservoir. The heat energy removed from the water in this reservoir is transferred to the cold R 22 vapors exiting the recovery turbine condenser on their way to the inlet fitting on the R 22 compressor.

The heat energy absorbed from the chilled water reservoir, additional heat sources, and other components located within the system's thermodynamic boundary, is contained in the R 22 compressor suction vapors.

The entire heat load from this subsystem, along with the energy imparted by the compressor's operation, is contained in the compressor discharge flow and is directed to the recovery turbine secondary inlet, at a nominal +160° F. at 200 psia, or as may be required by recovery turbine design factors.

Here, the R 22 compressor discharge joins with R 22 flow from prior recovery turbine stages. This secondary flow imparts its energy directly to the lower heat value vapor flow it mixes with, and the entire flow continues in the energy conversion done by the recovery turbine.

As the energy level input to the recovery turbine secondary inlet connection from the R 22 compressor increases, recovery turbine exhaust vapor flow rate can increase by a significant factor. This tends to increase pressure within the recovery turbine condenser and recovery turbine discharge annulus. This changes the percentage of R 22 condensed by altering the R 22 pressure and temperature relationship.

Increasing R 22 pressure within the recovery turbine condenser can cause additional low temperature R 22 compressor suction vapor flow. With such an increase in R 22 subsystem's flow rate, it is more able to regulate the ammonia subsystem maximum condensing temperature, as well as improved ability to accommodate increased heat loads from the chilled water subsystem and environmental factors.

Referring now to FIG. 10, the ammonia subsystem starts at the ammonia receiver, where liquid ammonia is stored. The pressure within the receiver is created by the liquid ammonia pump. This pump ensures adequate ammonia liquid flow to the recovery turbine condenser. This pump is also necessary to overcome friction losses caused by an increase in viscosity when the liquid ammonia is subcooled in the following system element, and from other fluidic resistances on the ammonia side of the recovery turbine condenser. The liquid pump imparts its energy to the ammonia liquid and to ambient.

As already discussed, the warm liquid ammonia is routed through a heat exchanger, with the warm liquid ammonia on one side, and the cold R 22 liquid being pumped from the condenser on the other. As stated previously, the R 22 liquid absorbs heat from the warm liquid ammonia, lowering the ammonia temperature, subcooling it to near −15° F.

This improves the refrigeration efficiency per pound of the ammonia, while decreasing the refrigeration efficiency per pound of the R 22 system by transferring the heat energy removed from the warm liquid ammonia to the cold liquid R 22. The ultimate effect of this results in an increased R 22 flow rate through the recovery turbine.

The ammonia liquid level within the recovery turbine condenser is regulated rather than using conventional thermal expansion valves. This reduces the complexity and enhances the reliability and serviceability of the ammonia evaporation control system.

The evaporating ammonia extracts the latent heat of condensation from the R 22 vapors exiting the recovery turbine. The ammonia vapor containing the latent heat of condensation from the R 22 is drawn to the ammonia compressor suction.

The ammonia evaporator pressure temperature relationship is controlled by regulating the ammonia compressor suction pressure. The heat removed from the R 22 vapors, along with the work done by the ammonia compressor, is contained within the vapor flow exiting the ammonia compressor.

The superheated ammonia vapor flow from the compressor discharge is now routed across a heat exchanger, with the hot ammonia compressor discharge vapors on one side, and cold liquid R 22 on the other.

The R 22 liquid, after having its pressure increased to 300 psia, passes through the ammonia subcooler. Here the ammonia liquid is cooled to near the evaporator temperature of −15° F., where the R 22 absorbs heat contained in the ammonia compressor discharge flow, and acts as the primary ammonia condenser. By imparting the heat energy from the hot ammonia compressor discharge vapors to the cold liquid R 22, the effective R 22 refrigeration capacity per pound is reduced. This increases the amount of R 22 required to remove sufficient heat from the exhaust gas condenser and propane heat exchangers to maintain design operating temperature. The ultimate effect of this results in an increased R 22 flow rate through the recovery turbine.

By transferring heat from the ammonia compressor discharge to the cold liquid R 22 exiting the recovery turbine condenser, the heat load that must be removed from the ammonia compressor discharge flow to accomplish ammonia condensation is significantly reduced.

Remaining ammonia vapors are routed next to heat the condensate (boiler feed water) leaving the steam condenser. Here the remaining latent heat of condensation contained in the ammonia compressor discharge is transferred to the boiler feed water. This increases the feed water temperature, reducing the amount of energy required for the boiler to turn the feed water to steam. The liquid ammonia now returns to the ammonia receiver, where this cycle is repeated.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A self-contained electrical generation system comprising:

a) an electrical generator;

b) a first prime mover, connected to said electrical generator, said first prime mover producing a quantity of heat;

c) a turbine, connected to said electrical generator as a second prime mover, whereby said first prime mover and said second prime mover operate simultaneously as part of an ongoing operation cycle;

d) a fluid means for driving the turbine;

e) a means for vaporizing said fluid means;

f) a means for condensing said fluid means; and g) a means for cooling exhaust gases from said first prime mover.

2. The self-contained electrical generation system of claim 1 wherein the means for vaporizing said fluid means includes heat produced by the first prime mover.

3. The self-contained electrical generation system of claim 1 wherein the means for condensing said fluid means comprises chilled ammonia gas.

4. The self-contained electrical generation system of claim 1 wherein said turbine is driven by a vaporized refrigerant gas.

5. The self-contained electrical generation system of claim 4 wherein the vaporized refrigerant gas is R 22 refrigerant.

6. The self-contained electrical generation system of claim 1 wherein the means for cooling exhaust gases from said diesel engine comprise an exhaust gas condenser.

7. The self-contained electrical generation system of claim 6 wherein the exhaust gas condenser comprises:

a) a vessel having an inlet port, an outlet port, and a hollow interior;

b) a means for conducting a quantity of exhaust gas from said diesel engine to said inlet port of said vessel;

c) a plurality of spray nozzles, suspended in said vessel;

d) a chilled water supply;

e) a means for moving a quantity of water from said chilled water supply to said plurality of spray nozzles, whereby as said quantity of exhaust gas passes through said vessel, said quantity of water is sprayed on said quantity of exhaust gas; and f) a means for recovering said quantity of water from said vessel.

8. The self-contained electrical generation system of claim 1 wherein the first prime mover is a diesel engine.

9. The self-contained electrical generation system of claim 1 wherein the first prime mover is a steam generator.

10. A self-contained electrical generation system comprising:

a) an electrical generator;

b) a diesel engine, connected to said electrical generator as a first prime mover;

c) a turbine, connected to said electrical generator as a second prime mover, whereby said first prime mover and said second prime mover operate simultaneously as part of an ongoing operation cycle;

d) a first refrigerant system, including a first refrigerant, a first liquid receiver, a quantity of first refrigerant, a first liquid manifold, an exhaust gas evaporator, a jacket water evaporator, and a first condenser, whereby said first refrigerant system produces a quantity of heated vapor to drive the turbine; and e) a second refrigerant system, including a second refrigerant, a second liquid receiver, a quantity of a second refrigerant, a liquid subcooler, an evaporator, a compressor, and a second condenser, whereby said second refrigerant system produces a quantity of cooled refrigerant to condense the quantity of heated vapor of said first refrigerant system, after the quantity of heated vapor has passed through the turbine.

11. The self-contained electrical generation system of claim 10 further comprising a chilled water system, in thermal communication with said first and second refrigerant systems.

12. The self-contained electrical generation system of claim 10 further comprising a third refrigerant system, including a third refrigerant, a third liquid receiver, a first heat exchanger in thermal communication with said first refrigerant, a superheater for raising the temperature of the first refrigerant, a compressor, and a second heat exchanger in thermal communication with said second refrigerant system.

13. The self-contained electrical generation system of claim 10 where the first refrigerant is Freon.

14. The self-contained electrical generation system of claim 10 where the second refrigerant is ammonia.

15. The self-contained electrical generation system of claim 12 where the third refrigerant is propane.

16. The method of generating electricity from a system having an electrical generator, a diesel engine, connected to said electrical generator as a first prime mover, a turbine, connected to said electrical generator as a second prime mover; whereby said first prime mover and said second prime mover operate simultaneously as part of an ongoing operation cycle comprising the steps of:

a) passing engine intake air through the generator;

b) passing the engine intake air through an engine intake air evaporative refrigeration system to cool ammonia liquid;

c) passing liquid R 22 through a series of heaters that simultaneously cool ammonia used in the system;

d) passing the heated R 22 into a liquid manifold;

e) passing a portion of the liquid R 22 to an exhaust gas evaporator, where said R 22 liquid is vaporized;

f) passing a second portion of the R 22 liquid to an engine jacket water evaporator, where it is vaporized;

g) passing both vaporized streams of R 22 through the turbine;

h) passing an exhausted R 22 vapor from the turbine to a condenser;

i) condensing said R 22 to a liquid state; and j) repeating steps a–i on a repeated basis to generate a continuous output of electricity.

17. The method of claim 16 wherein the diesel engine produces an exhaust stream; and further, wherein said exhaust stream is passed through an exhaust gas condenser.

18. The method of claim 17 wherein the exhaust gas condenser comprises:

a) a vessel having an inlet port, an outlet port, and a hollow interior;

b) a means for conducting a quantity of exhaust gas from said diesel engine to said inlet port of said vessel;

c) a plurality of spray nozzles, suspended in said vessel;

d) a chilled water supply;

e) a means for moving a quantity of water from said chilled water supply to said plurality of spray nozzles, whereby as said quantity of exhaust gas passes through said vessel, said quantity of water is sprayed on said quantity of exhaust gas; and f) a means for recovering said quantity of water from said vessel.

* * * * *